US011351575B2

(12) United States Patent
Wagner et al.

(10) Patent No.: US 11,351,575 B2
(45) Date of Patent: Jun. 7, 2022

(54) PERCEPTION SYSTEMS AND METHODS FOR IDENTIFYING AND PROCESSING A VARIETY OF OBJECTS

(71) Applicant: Berkshire Grey Operating Company, Inc., Bedford, MA (US)

(72) Inventors: Thomas Wagner, Concord, MA (US); Kevin Ahearn, Fort Mill, SC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 79 days.

(21) Appl. No.: 16/900,158

(22) Filed: Jun. 12, 2020

(65) Prior Publication Data
US 2020/0368785 A1 Nov. 26, 2020

Related U.S. Application Data

(63) Continuation of application No. 16/407,965, filed on May 9, 2019, now Pat. No. 10,737,299, which is a
(Continued)

(51) Int. Cl.
*B07C 5/34* (2006.01)
*H04N 5/247* (2006.01)
(Continued)

(52) U.S. Cl.
CPC .......... *B07C 5/3412* (2013.01); *G01B 11/245* (2013.01); *G05B 19/4183* (2013.01);
(Continued)

(58) Field of Classification Search
CPC ..... B07C 5/3412; B07C 5/342; G01B 11/245; G05B 19/4183; G06K 7/10693; G06K 7/10732; G06K 7/10881; G06K 7/1413
See application file for complete search history.

(56) References Cited

U.S. PATENT DOCUMENTS 3,734,286 A 5/1973 Simjian
3,864,566 A 2/1975 Simpson et al.
(Continued)

FOREIGN PATENT DOCUMENTS

AU 2006204622 A1 3/2007
CN 1033604 A 7/1989
(Continued)

OTHER PUBLICATIONS

Notice on the Second Office and the Second Office Action, along with its English translation, issued by the China National Intellectual Property Administration in related Chinese Patent Application No. 201680081764.5 dated Apr. 13, 2021, 14 pages.
(Continued)

*Primary Examiner* — Terrell H Matthews
(74) *Attorney, Agent, or Firm* — Gesmer Updegrove, LLP

(57) ABSTRACT

A drop perception system is disclosed that includes an open housing structure having an internal volume, an open top and an open bottom, and a plurality of perception units positioned to capture perception data within the internal
(Continued)

volume at a plurality of locations between the open top and the open bottom of the open housing.

40 Claims, 23 Drawing Sheets

Related U.S. Application Data continuation of application No. 15/901,656, filed on Feb. 21, 2018, now Pat. No. 10,730,077, which is a continuation of application No. 15/228,692, filed on Aug. 4, 2016, now Pat. No. 9,937,532.

(60) Provisional application No. 62/269,640, filed on Dec. 18, 2015.

(51) Int. Cl.
*H04N 5/225* (2006.01)
*G01B 11/245* (2006.01)
*G05B 19/418* (2006.01)
*G06K 7/10* (2006.01)
*G06V 20/80* (2022.01)
*G06K 7/14* (2006.01)
*G06K 19/06* (2006.01)

(52) U.S. Cl.
CPC ..... *G06K 7/10693* (2013.01); *G06K 7/10732* (2013.01); *G06K 7/10881* (2013.01); *G06K 7/1413* (2013.01); *G06K 19/06028* (2013.01); *G06V 20/80* (2022.01); *H04N 5/2256* (2013.01); *H04N 5/247* (2013.01); *B07C 2301/0016* (2013.01); *G05B 2219/36371* (2013.01); *G05B 2219/45045* (2013.01); *G05B 2219/45047* (2013.01); *G06V 2201/06* (2022.01); *Y02P 90/02* (2015.11)

(56) References Cited

U.S. PATENT DOCUMENTS

| | | |
|---|---|---|
| 4,186,836 A | 2/1980 | Wassmer et al. |
| 4,704,694 A | 11/1987 | Czerniejewski |
| 4,722,653 A | 2/1988 | Williams et al. |
| 4,759,439 A | 7/1988 | Hartlepp |
| 4,819,784 A | 4/1989 | Sticht |
| 4,846,335 A | 7/1989 | Hartlepp |
| 4,895,242 A | 1/1990 | Michel |
| 5,190,162 A | 3/1993 | Hartlepp |
| 5,495,097 A * | 2/1996 | Katz .................. G06K 7/10633 235/462.12 |
| 5,648,709 A | 7/1997 | Maeda |
| 5,713,473 A | 2/1998 | Satake |
| 5,742,420 A | 4/1998 | Peng |
| 5,794,788 A | 8/1998 | Massen |
| 5,794,789 A | 8/1998 | Payson et al. |
| 5,839,566 A | 11/1998 | Bonnet |
| 5,875,434 A | 2/1999 | Matsuoka et al. |
| 5,996,316 A | 12/1999 | Kirschner |
| 6,059,092 A | 5/2000 | Jerue et al. |
| 6,060,677 A | 5/2000 | Ulrichsen et al. |
| 6,076,023 A | 6/2000 | Sato |
| 6,079,570 A | 6/2000 | Oppliger et al. |
| 6,087,608 A * | 7/2000 | Schlichter .................. D01G 7/10 209/580 |
| 6,124,560 A | 9/2000 | Roos et al. |
| 6,208,908 B1 | 3/2001 | Boyd et al. |
| 6,246,023 B1 | 6/2001 | Kugle |
| 6,323,452 B1 | 11/2001 | Bonnet |
| 6,390,756 B1 | 5/2002 | Isaacs et al. |
| 6,401,936 B1 | 6/2002 | Isaacs et al. |
| 6,505,093 B1 | 1/2003 | Thatcher et al. |
| 6,579,053 B1 | 6/2003 | Grams et al. |
| 6,685,031 B2 | 2/2004 | Takizawa |
| 6,688,459 B1 | 2/2004 | Bonham et al. |
| 6,705,528 B2 * | 3/2004 | Good .................. G06K 7/10564 235/472.01 |
| 6,721,444 B1 | 4/2004 | Gu et al. |
| 6,762,382 B1 | 7/2004 | Danelski |
| 6,946,612 B2 | 9/2005 | Morikawa |
| 7,313,464 B1 | 12/2007 | Perreault et al. |
| 7,347,376 B1 | 3/2008 | Biss et al. |
| 7,474,939 B2 | 1/2009 | Oda et al. |
| 7,516,848 B1 | 4/2009 | Shakes et al. |
| 8,662,314 B2 | 3/2014 | Jones et al. |
| 8,718,814 B1 | 5/2014 | Clark et al. |
| 8,776,694 B2 | 7/2014 | Rosenwinkel et al. |
| 8,811,722 B2 | 8/2014 | Perez Cortes et al. |
| 8,823,801 B2 | 9/2014 | Jacobson |
| 8,874,270 B2 | 10/2014 | Ando |
| 8,972,049 B2 | 3/2015 | Tidhar et al. |
| 9,102,053 B2 | 8/2015 | Suzuki |
| 9,102,055 B1 | 8/2015 | Konolige et al. |
| 9,102,336 B2 | 8/2015 | Rosenwinkel |
| 9,120,622 B1 | 9/2015 | Elazary et al. |
| 9,227,323 B1 | 1/2016 | Konolige et al. |
| 9,256,775 B1 | 2/2016 | Yasunaga |
| 9,259,844 B2 | 2/2016 | Xu et al. |
| 9,266,237 B2 | 2/2016 | Nomura |
| 9,283,680 B2 | 3/2016 | Yasuda et al. |
| 9,364,865 B2 | 6/2016 | Kim |
| 9,381,645 B1 | 7/2016 | Yarlagadda et al. |
| 9,481,518 B2 | 11/2016 | Neiser |
| 9,486,926 B2 | 11/2016 | Kawano |
| 9,492,923 B2 | 11/2016 | Wellman et al. |
| 9,604,363 B2 | 3/2017 | Ban |
| 9,751,693 B1 | 9/2017 | Battles et al. |
| 9,821,464 B2 | 11/2017 | Stiernagle et al. |
| 9,878,349 B2 | 1/2018 | Crest et al. |
| 9,926,138 B1 | 3/2018 | Brazeau et al. |
| 9,937,532 B2 | 4/2018 | Wagner et al. |
| 9,962,743 B2 | 5/2018 | Bombaugh et al. |
| 9,975,148 B2 | 5/2018 | Zhu et al. |
| 10,007,827 B2 * | 6/2018 | Wagner .................. B25J 19/023 |
| 10,029,865 B1 | 7/2018 | McCalib, Jr. et al. |
| 10,058,896 B2 | 8/2018 | Hicham et al. |
| 10,127,514 B2 | 11/2018 | Napoli |
| 10,737,299 B2 * | 8/2020 | Wagner .................. G01B 11/245 |
| 11,046,530 B2 | 6/2021 | Koga |
| 2001/0056313 A1 | 12/2001 | Osborne, Jr. |
| 2002/0092801 A1 | 7/2002 | Dominguez |
| 2002/0147568 A1 | 10/2002 | Wenzel et al. |
| 2002/0169698 A1 | 11/2002 | Chien |
| 2002/0179502 A1 | 12/2002 | Cerutti et al. |
| 2003/0029946 A1 | 2/2003 | Lieber et al. |
| 2003/0034281 A1 | 2/2003 | Kumar |
| 2003/0038065 A1 | 2/2003 | Pippin et al. |
| 2004/0261366 A1 | 12/2004 | Gillet et al. |
| 2005/0002772 A1 | 1/2005 | Stone |
| 2005/0268579 A1 | 12/2005 | Natterer |
| 2006/0022824 A1 | 2/2006 | Olsen, III et al. |
| 2006/0045672 A1 | 3/2006 | Maynard et al. |
| 2006/0070929 A1 | 4/2006 | Fry et al. |
| 2006/0182543 A1 | 8/2006 | Schaefer |
| 2006/0190356 A1 | 8/2006 | Nemet |
| 2007/0043468 A1 | 2/2007 | Schaefer et al. |
| 2007/0209976 A1 | 9/2007 | Worth et al. |
| 2008/0046116 A1 | 2/2008 | Khan et al. |
| 2008/0181485 A1 | 7/2008 | Beis et al. |
| 2008/0181753 A1 | 7/2008 | Bastian et al. |
| 2010/0125361 A1 | 5/2010 | Mougin et al. |
| 2010/0260380 A1 | 10/2010 | Kaeser et al. |
| 2010/0292841 A1 | 11/2010 | Wickham |
| 2010/0318216 A1 | 12/2010 | Faivre et al. |
| 2011/0144798 A1 | 6/2011 | Freudelsperger |
| 2011/0184555 A1 | 7/2011 | Kosuge et al. |
| 2011/0238207 A1 | 9/2011 | Bastian, II et al. |
| 2011/0243707 A1 | 10/2011 | Dumas et al. |
| 2011/0320036 A1 | 12/2011 | Freudelsperger |
| 2012/0118699 A1 | 5/2012 | Buchmann et al. |
| 2012/0177465 A1 | 7/2012 | Koholka |
| 2012/0219397 A1 | 8/2012 | Baker |

(56) References Cited

U.S. PATENT DOCUMENTS

| | | | |
|---|---|---|---|
| 2013/0051696 A1* | 2/2013 | Garrett | G01W 1/14 |
| | | | 382/254 |
| 2013/0051969 A1 | 2/2013 | Takeuchi et al. | |
| 2013/0202195 A1* | 8/2013 | Perez Cortes | G06T 15/08 |
| | | | 382/154 |
| 2013/0235372 A1 | 9/2013 | Voss | |
| 2013/0245824 A1 | 9/2013 | Barajas et al. | |
| 2014/0067127 A1 | 3/2014 | Gotou | |
| 2014/0105719 A1 | 4/2014 | Mueller et al. | |
| 2014/0166549 A1 | 6/2014 | Ito et al. | |
| 2014/0305847 A1 | 10/2014 | Kudrus | |
| 2014/0360924 A1* | 12/2014 | Smith | B07C 5/362 |
| | | | 209/10 |
| 2015/0057793 A1 | 2/2015 | Kawano | |
| 2015/0073589 A1 | 3/2015 | Khodl et al. | |
| 2015/0081090 A1* | 3/2015 | Dong | B07C 5/00 |
| | | | 700/230 |
| 2015/0081091 A1 | 3/2015 | Blomquist et al. | |
| 2015/0217937 A1 | 8/2015 | Marquez | |
| 2015/0224650 A1 | 8/2015 | Xu et al. | |
| 2015/0283586 A1 | 10/2015 | Dante et al. | |
| 2015/0306634 A1 | 10/2015 | Maeda et al. | |
| 2015/0352721 A1 | 12/2015 | Wicks et al. | |
| 2015/0375398 A1 | 12/2015 | Penn et al. | |
| 2015/0378345 A1 | 12/2015 | Winkler | |
| 2016/0136816 A1 | 5/2016 | Pistorino | |
| 2016/0221762 A1 | 8/2016 | Schroader | |
| 2016/0228921 A1 | 8/2016 | Doublet et al. | |
| 2016/0243704 A1 | 8/2016 | Vakanski et al. | |
| 2016/0244262 A1 | 8/2016 | O'Brien et al. | |
| 2016/0379076 A1 | 12/2016 | Nobuoka et al. | |
| 2017/0024896 A1 | 1/2017 | Houghton et al. | |
| 2017/0043953 A1 | 2/2017 | Battles et al. | |
| 2017/0050315 A1 | 2/2017 | Henry et al. | |
| 2017/0066597 A1 | 3/2017 | Hiroi | |
| 2017/0080566 A1 | 3/2017 | Stubbs et al. | |
| 2017/0087731 A1 | 3/2017 | Wagner et al. | |
| 2017/0128986 A1* | 5/2017 | Sterkel | G01N 3/40 |
| 2017/0136632 A1 | 5/2017 | Wagner et al. | |
| 2017/0137232 A1 | 5/2017 | Messner | |
| 2017/0157648 A1 | 6/2017 | Wagner et al. | |
| 2017/0157649 A1* | 6/2017 | Wagner | B07C 5/3412 |
| 2017/0173638 A1 | 6/2017 | Wagner et al. | |
| 2017/0225330 A1 | 8/2017 | Wagner et al. | |
| 2018/0075406 A1 | 3/2018 | Kingston et al. | |
| 2018/0085788 A1 | 3/2018 | Engel et al. | |
| 2018/0127219 A1 | 5/2018 | Wagner et al. | |
| 2018/0148272 A1 | 5/2018 | Wagner et al. | |
| 2018/0186572 A1 | 7/2018 | Issing | |
| 2018/0265291 A1 | 9/2018 | Wagner et al. | |
| 2018/0265298 A1 | 9/2018 | Wagner et al. | |
| 2018/0265311 A1 | 9/2018 | Wagner et al. | |
| 2018/0273295 A1 | 9/2018 | Wagner et al. | |
| 2018/0273296 A1 | 9/2018 | Wagner et al. | |
| 2018/0273297 A1 | 9/2018 | Wagner et al. | |
| 2018/0273298 A1 | 9/2018 | Wagner et al. | |
| 2018/0282065 A1 | 10/2018 | Wagner et al. | |
| 2018/0282066 A1 | 10/2018 | Wagner et al. | |
| 2018/0312336 A1 | 11/2018 | Wagner et al. | |
| 2018/0327198 A1 | 11/2018 | Wagner et al. | |
| 2018/0330134 A1 | 11/2018 | Wagner et al. | |
| 2018/0333749 A1 | 11/2018 | Wagner et al. | |
| 2019/0022702 A1 | 1/2019 | Vegh et al. | |
| 2019/0047786 A1 | 2/2019 | Suzuki | |
| 2019/0102712 A1 | 4/2019 | Duca | |
| 2019/0329979 A1 | 10/2019 | Wicks et al. | |
| 2021/0061563 A1 | 3/2021 | Ueda et al. | |

FOREIGN PATENT DOCUMENTS

| | | | |
|---|---|---|---|
| CN | 1671489 A | 9/2005 | |
| CN | 101482879 A | 7/2009 | |
| CN | 101971221 A | 2/2011 | |
| CN | 102363354 A | 2/2012 | |
| CN | 102430530 A | 5/2012 | |
| CN | 102621155 A | 8/2012 | |
| CN | 202539084 U | 11/2012 | |
| CN | 103129783 A | 6/2013 | |
| CN | 103942518 A | 7/2014 | |
| CN | 104093650 A | 10/2014 | |
| CN | 104137051 A | 11/2014 | |
| CN | 108700869 A | 10/2018 | |
| DE | 3919865 A1 | 12/1990 | |
| DE | 19510392 A1 | 9/1996 | |
| DE | 102004001181 A1 | 8/2005 | |
| DE | 102004013353 A1 | 10/2005 | |
| DE | 102005061309 A1 | 7/2007 | |
| DE | 102007023909 A1 | 11/2008 | |
| DE | 102007038834 A1 | 2/2009 | |
| DE | 102010002317 A1 | 8/2011 | |
| DE | 102012102333 A1 | 9/2013 | |
| DE | 102014111396 A1 | 2/2016 | |
| EP | 0235488 A1 | 9/1987 | |
| EP | 837415 A1 | 4/1998 | |
| EP | 1995192 A2 | 11/2008 | |
| EP | 2053350 A1 | 4/2009 | |
| EP | 2511653 A1 | 10/2012 | |
| EP | 2823899 A1 | 1/2015 | |
| GB | 2084531 A | 4/1982 | |
| GB | 2356383 A | 5/2001 | |
| GB | 2507707 A | 5/2014 | |
| JP | S54131278 A | 10/1979 | |
| JP | S63310406 A | 12/1988 | |
| JP | H0395001 A | 4/1991 | |
| JP | H05324662 A | 12/1993 | |
| JP | H08157016 A | 6/1996 | |
| JP | 2002175543 A | 6/2002 | |
| JP | 2003150230 | 5/2003 | |
| JP | 2007182286 A | 7/2007 | |
| JP | 2008037567 A | 2/2008 | |
| KR | 101413393 B1 | 6/2014 | |
| WO | 2005022076 A2 | 3/2005 | |
| WO | WO-2005022076 A2 * | 3/2005 | G01B 11/245 |
| WO | 2007009136 A2 | 1/2007 | |
| WO | 2010034044 A2 | 4/2010 | |
| WO | 2010099873 A1 | 9/2010 | |
| WO | 2011038442 A2 | 4/2011 | |
| WO | 2014166650 A1 | 10/2014 | |
| WO | 2015118171 A1 | 8/2015 | |
| WO | 2015162390 A1 | 10/2015 | |
| WO | 2017036780 A1 | 3/2017 | |

OTHER PUBLICATIONS

Examiner's Report issued by the Canadian Intellectual Property Office dated Dec. 7, 2020 in related Canadian Patent Application No. 2,998,544, 4 pages.

Examiner's Report issued by the Innovation, Science and Economic Development Canada in related Canadian Patent Application No. 3,009,102 dated Jan. 12, 2021, 3 pages.

International Preliminary Report on Patentability issued by the International Bureau of WIPO in related International Application No. PCT/US2016/050949 dated Mar. 13, 2018, 10 pages.

International Search Report and Written Opinion issued by the International Searching Authority in related International Application No. PCT/US2016/050949 dated Dec. 8, 2016, 13 pages.

International Search Report and Written Opinion issued by the International Searching Authority in related International Application No. PCT/US2016/066786 dated Mar. 20, 2017, 14 pages.

International Preliminary Report on Patentability issued by the International Bureau of WIPO in related International Application No. PCT/US2016/066786 dated Jun. 19, 2018, 11 pages.

Non-Final Office Action issued by the U.S. Patent and Trademark Office dated May 22, 2017 in related U.S. Appl. No. 15/228,692, 13 pages.

Bohg, Jeannette, et al., "Data-Driven Grasp Synthesis—A Survey," Transactions on Robotics, pp. 289-309, Apr. 14, 2016.

Rembold, Derk et al., "Object Turning for Barcode Search," Proceedings of the 2000 IEEE/RSK—Int'l Conf. on Intelligent Robots and Systems, p. 1267, Oct. 31, 2000.

(56) References Cited

OTHER PUBLICATIONS

Cipolla, Roberto et al., "Visually Guided Grasping in Unstructured Environments," Journal of Robotics and Autonomous Systems, pp. 337-346, Mar. 3, 2001.
Klingbeil, Ellen et al., "Grasping with Application to an Autonomous Checkout Robot," Proceedings—IEEE Int'l Conf. on Robotics and Automation, pp. 2837-2844, May 9, 2011.
Non-Final Office Action issued by the U.S. Patent and Trademark Office dated Jun. 18, 2019 in related U.S. Appl. No. 15/982,238, 27 pages.
Final Office Action issued by the U.S. Patent and Trademark Office dated Nov. 7, 2019 in related U.S. Appl. No. 15/982,238, 15 pages.
First Examiner's Report issued by the Canadian Intellectual Property Office dated Jan. 21, 2019 in related Canadian Patent Application No. 2,998,544, 4 pages.
Examiner's Report issued by the Canadian Intellectual Property Office on Jan. 6, 2020 in related Canadian Patent Application No. 2,998,544, 4 pages.
Communication pursuant to Rules 161(1) and 162 EPC issued by the European Patent Office dated Apr. 18, 2018, in related European Patent Application No. 16778496.6, 3 pages.
Communication pursuant to Rules 161(1) and 162 EPC issued by the European Patent Office dated Aug. 9, 2018, in related European Patent Application No. 16826518.9, 3 pages.
First Examiner's Report issued by the Canadian Intellectual Property Office dated Apr. 15, 2019 in related Canadian Patent Application No. 3,009,102, 3 pages.
Wikipedia, "Machine Vision," Wikipedia.org, Mar. 1, 2017 (https://en.wikipedia.org/w/index.php?title=Machine_vision&oldid=768036938).
Wikipedia, "Automatic Identification and Data Capture," Wikipedia.org, Mar. 10, 2017 (https://en.wikipedia.org/w/index.php?title=Automatic-idenification_and_data_capture&oldid=0769563714).
Non-Final Office Action issued by the U.S. Patent and Trademark Office dated Apr. 25, 2017 in related U.S. Appl. No. 15/260,837, 28 pages.
Final Office Action issued by the U.S. Patent and Trademark Office dated Oct. 11, 2017 in related U.S. Appl. No. 15/260,837, 32 pages.
Non-Final Office Action issued by the U.S. Patent and Trademark Office dated Mar. 21, 2019 in related U.S. Appl. No. 15/901,656, 10 pages.
Non-Final Office Action issued by the U.S. Patent and Trademark Office dated Oct. 22, 2019 in related U.S. Appl. No. 15/901,656, 13 pages.
Examiner's Report issued by the Canadian Intellectual Property Office dated Mar. 6, 2020 in related Canadian Patent Application No. 3,009,102, 3 pages.
Examiner's Report issued by the Innovation, Science and Economic Development Canada (Canadian Intellectual Property Office) dated Nov. 5, 2021 in related Canadian Patent Application No. 2,998,544, 4 pages.
Notice on the Third Office and the Third Office Action, along with its English translation, issued by the China National Intellectual Property Administration in related Chinese Patent Application No. 201680081764.5 dated Oct. 20, 2021, 12 pages.
First Office Action, and its English translation, issued by the China National Intellectual Property Administration dated May 6, 2020 in related Chinese Patent Application No. 201680065881.2, 23 pages.
First Office Action, and its English translation, issued by the China National Intellectual Property Administration dated Jun. 24, 2020 in related Chinese Patent Application No. 201680081764.5, 18 pages.
Notice on the Second Office Action, and the Second Office Action, issued by the China National Intellectual Property Administration in related Chinese Patent Application No. 201680065881.2 dated Jan. 29, 2021, 7 pages.
Communication pursuant to Article 94(3) EPC issued by the European Patent Office in related European Patent Application No. 16778496.6 dated Feb. 24, 2021, 6 pages.
Communication pursuant to Article 94(3) EPC issued by the European Patent Office in related European Patent Application No. 16826518.9 dated Mar. 4, 2021, 10 pages.
Examiner's Report issued by the Innovation, Science and Economic Development Canada (Canadian Intellectual Property Office) in related Canadian Patent Application No. 3,009,102 dated Dec. 31, 2021, 4 pages.
Non-Final Office Action issued by the United States Patent and Trademark Office in related U.S. Appl. No. 16/800,587 dated Feb. 11, 2022, 27 pages.
Notice on Grant of Patent Right for Invention and Search Report, along with its English translation, issued by the China National Intellectual Property Administration in related Chinese Patent Application No. 201680081764.5 dated Mar. 3, 2022, 8 pages.
Communication pursuant to Article 94(3) EPC issued by the European Patent Office in related European Patent Application No. 16826518.9 dated Mar. 22, 2022, 8 pages.

\* cited by examiner

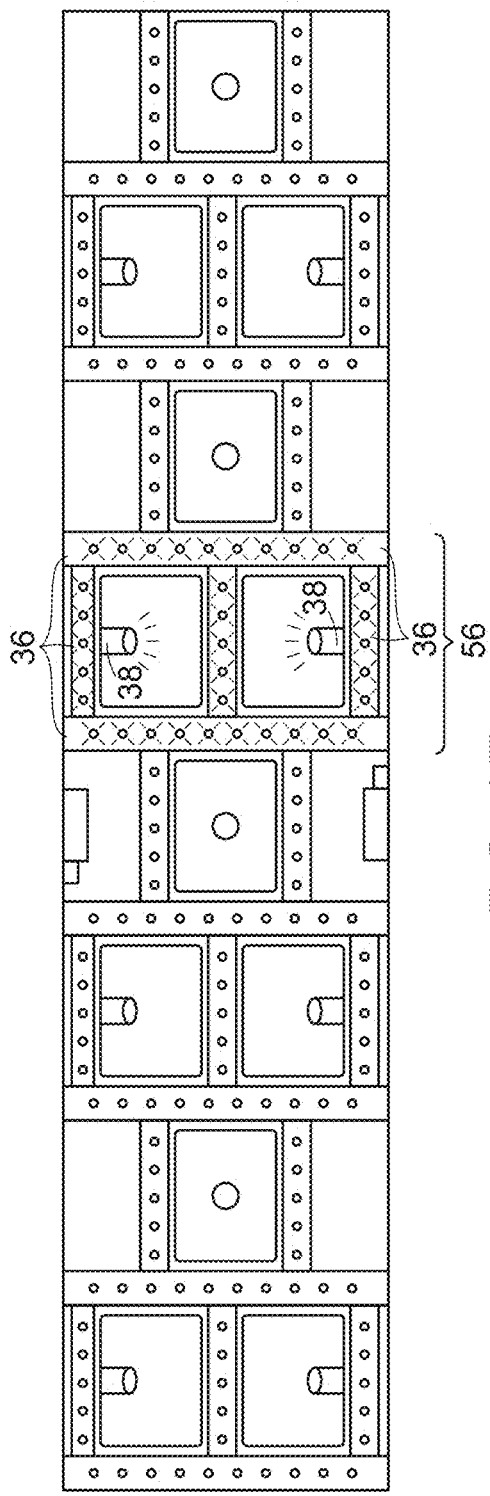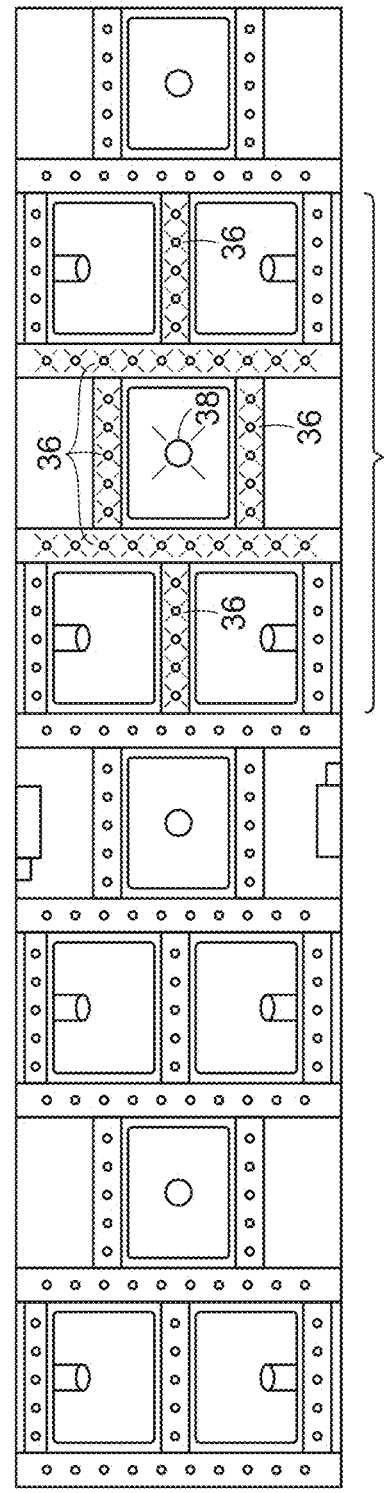
FIG. 9E
FIG. 9F

PERCEPTION SYSTEMS AND METHODS FOR IDENTIFYING AND PROCESSING A VARIETY OF OBJECTS

PRIORITY

The present application is a continuation of U.S. patent application Ser. No. 16/407,965, filed May 9, 2019; which is a continuation of U.S. patent application Ser. No. 15/901,656, filed Feb. 21, 2018; which is a continuation of U.S. patent application Ser. No. 15/228,692, filed Aug. 4, 2016, now U.S. Pat. No. 9,937,532, issued Apr. 10, 2018; which claims priority to U.S. Provisional Patent Application Ser. No. 62/269,640 filed Dec. 18, 2015, the disclosures of which are hereby incorporated by reference in their entireties.

BACKGROUND

The invention generally relates to perception systems, and relates in particular to scanning systems for use in connection with robotic and other sortation systems that are intended to be used in dynamic environments requiring the robotic or other sortation system to accommodate processing a variety of types of objects.

For example many order fulfillment operations achieve high efficiency by employing a process called wave picking. In wave picking, orders are picked from warehouse shelves and placed at locations (e.g., into bins) containing multiple orders that are sorted downstream. At the sorting stage individual articles are identified, and multi-article orders are consolidated, for example into a single bin or shelf location, so that they may be packed and then shipped to customers. The process of sorting these articles has traditionally been done by hand. A human sorter picks an article from an incoming bin, finds a barcode on the object, scans the barcode with a handheld barcode scanner, determines from the scanned barcode the appropriate bin or shelf location for the article, and then places the article in the so-determined bin or shelf location where all articles for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

Other ways of identifying items by code scanning either require manual processing, or require that the code location be controlled or constrained so that a fixed or robot-held code scanner (e.g., barcode scanner) can reliably detect it. Manually operated barcode scanners are generally either fixed or handheld systems. With fixed systems, such as those used at point-of-sale systems, the operator holds the article and places it in front of the scanner so that the barcode faces the scanning device's sensors, and the scanner, which scans continuously and decodes any barcodes that it can detect. If the article is not immediately detected, the person holding the article typically needs to vary the position or rotation of the object in front of the fixed scanner, so as to make the barcode more visible to the scanner. For handheld systems, the person operating the scanner looks for the barcode on the article, and then holds the scanner so that the article's barcode is visible to the scanner, and then presses a button on the handheld scanner to initiate a scan of the barcode.

Automatic barcode scanners are similarly either fixed or hand-held systems, and the same principles apply. In the case of barcode scanners typically used in industrial applications, the possible positions of barcodes must be tightly controlled so that they are visible to the one or more scanners. For example, one or more barcode scanners may be placed in fixed locations relative to a conveyor so that they can scan items, typically boxes, as they pass by scanners. See, for example, U.S. Pat. No. 5,495,097. In these installations the range of placement of the barcodes is comparatively limited as the barcodes are on labels affixed to one of four sides or top or bottom (e.g., if upside down) of a box, which can be presented using simple mechanical means, at orientations optimal for scanning.

In all of these cases, the systems employ sensors, cameras or laser reflectivity sensors, as well as software to detect barcodes and decode them. These methods have inherent limitations that include the range of distances of orientations relative to the detection system, over which they are able to reliably scan barcodes. Firstly, the barcode must be facing the scanner; secondly the range to the barcode must be such that individual elements can be reliably distinguished; and, thirdly, the tilt and skew of the barcode must be such that individual elements can be reliably distinguished. The types of sensors employed, and the robustness of the software detection and decoding schemes determine these performance parameters.

There remains a need, therefore, for an object identification system for robotic and other sortation systems that is able to accommodate the automated identification and processing of a variety of objects in a variety of orientations.

SUMMARY

In accordance with an embodiment, the invention provides a drop perception system that includes an open housing structure having an internal volume, an open top and an open bottom, and a plurality of perception units positioned to capture perception data within the internal volume at a plurality of locations between the open top and the open bottom of the open housing.

In accordance with another embodiment, the invention provides a perception system for assisting in identifying an object, the perception system including a plurality of perception units that are each positioned to be directed toward different portions of an object path that an object takes as the object travels through the perception system without assistance by any mechanical conveyance system in contact with the object.

In accordance with a further embodiment, the invention provides a drop perception system for identifying an object, the drop perception system including a plurality of perception units that are each positioned to be directed toward different portions of an object path that an object may take as the object falls through the drop perception system, and each perception unit is engageable to provide perception data regarding the object.

In accordance with a further embodiment, the invention provides a method of sorting objects. The method includes the steps of dropping an object into a perception system that includes a plurality of perception units that are each positioned to be directed toward different portions of a path that the object may take as the object falls through the perception unit, and engaging the perception units to capture perception data associated with the object.

BRIEF DESCRIPTION OF THE DRAWINGS

The following description may be further understood with reference to the accompanying drawings in which:

FIGS. 9A-9H show illustrative linear diagrammatic views of the inside of the perception system of FIG. 3 showing different stages of illumination and perception data captures;

Figure 1:
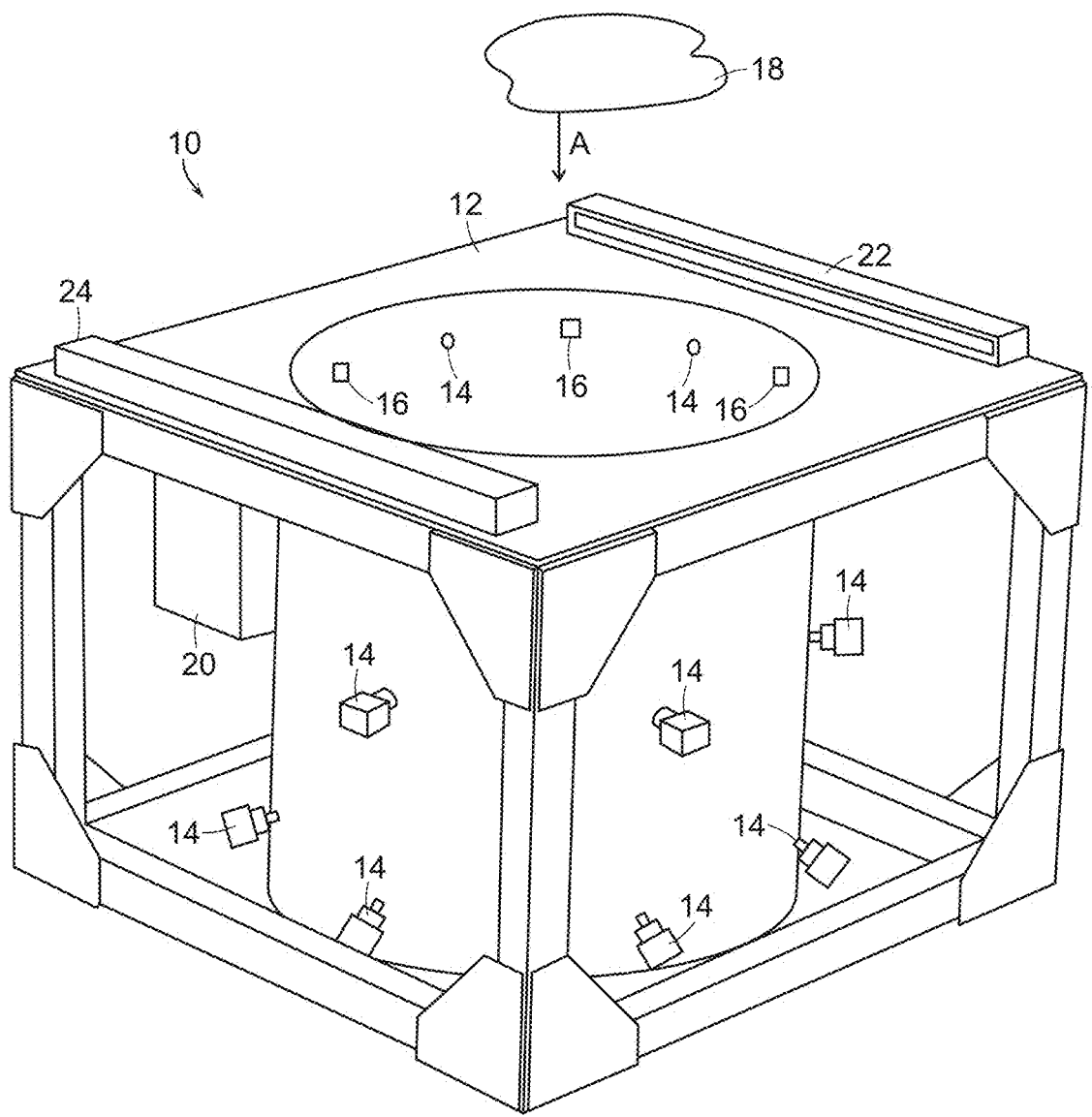
FIG. 1 shows an illustrative isometric diagrammatic view of a perception system in accordance with an embodiment of the present invention.

The drawings are shown for illustrative purposes only.

DETAILED DESCRIPTION

In accordance with an embodiment, the invention provides a novel object perception system for the purposes of automatically sorting individual objects in a set. In applications such as order fulfillment, articles or goods are collected into heterogeneous sets and need to be sorted. Individual objects need to be identified and then routed to object-specific locations. The described systems reliably automate the identification of such objects by employing automated scanners. The scanners look for a variety of codes such as indicia (e.g., barcodes, radio frequency tags, Stock Keeping Unit (SKU), Universal Product Code (UPC), Digimarc DWCode, etc.).

Operating in conjunction with a robotic pick and place system, systems in accordance with various embodiments of the invention automate part of the sorting process, in particular the step of identifying picked objects. Instead of a person picking the object from a bin for example, a robotic arm picks an article from a bin. The object is passed in front of a plurality of barcode scanners, and then, having obtained identification codes for the object, the object is then routed to the appropriate bin or shelf location. Since barcode scanners employ cameras or lasers to scan 1D or 2D symbologies printed on labels affixed to objects, the barcodes must be visible to the scanner's sensors for successful scanning in order to automatically identifying items in a heterogeneous stream of arbitrary objects, as in a jumbled set of objects found in a bin.

Whereas fixed industrial scanners require that the object's barcode be situated so that its barcode is visible to a scanner, the robotic arm of the present invention may pick an object out of a heterogeneous collection of objects where the barcode is not visible and drop the object into a perception system of the present invention. In other embodiments, the system may provide that objects are dropped into the perception system by providing a feed conveyor positioned above the perception system, and providing that objects are singulated on the conveyor. The result is an automated barcode scanning system for arbitrary objects in a heterogeneous stream of objects that can be used to accurately and reliably identify the objects.

Sorting for order fulfillment is one application for automatically identifying objects from a heterogeneous object stream. Barcode scanners have a wide variety of further uses including identifying the stock keeping unit of an article, or tracking parcels. The described systems may have many uses in the automatic identification and sortation of objects.

In accordance with various embodiments, therefore, the invention provides a method for determining the identity of an object from a collection of objects, as well as a method for scanning the barcode of an object employing one or more scanners and a sortation system for differently processing different objects. The invention further provides a method for determining the placement of fixed barcode scanners so as to maximize the probability of successfully scanning an object selected by a robot end-effector in accordance with certain embodiments, as well as a method for determining whether multiple objects are dropped into the scanner at the same time.

Figure 2:
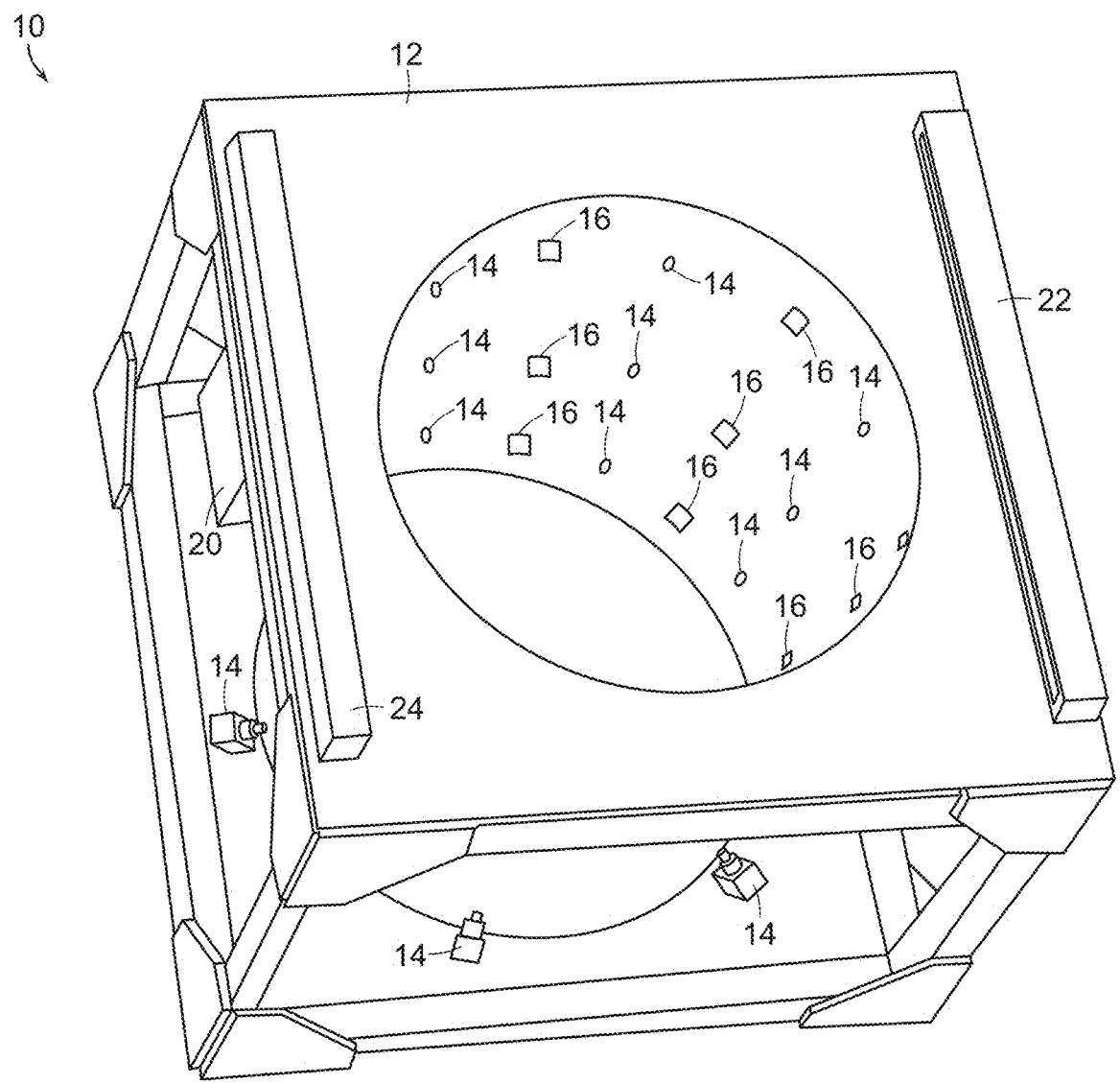
FIG. 2 shows a front illustrative diagrammatic view of the perception system of FIG. 1.

An important aspect is the ability to identify via barcode or other visual markings of objects by employing a perception system into which objects may be dropped. Automated scanning systems would be unable to see barcodes on objects that are presented in a way that their barcodes are not exposed or visible. As shown in FIG. 1, a perception system 10 in accordance with an embodiment of the present invention may include an open housing 12 through which an object may be dropped. Inside the hosing is a plurality of perception units 14 (e.g., eight or twelve) that are generally directed toward the interior of the housing from many different directions. The housing may also include a plurality of lights 16 that are timed to provide bright dispersed light at the times that each of the perception units 14 take pictures of a falling object 18. Each perception unit 14 may, for example, take a hundred images while an object is falling from directions as indicated at A in FIG. 2. The detection units 14 may be connected to a processing system 20 that reviews each of the images in search of a unique identifier such as a barcode. The perception units may include cameras (e.g., 2D or 3D) or scanners (e.g., a laser reflectivity scanner other type of barcode reader (such as 1D or 2D barcode scanners, or radio frequency ID scanner), and the processing system 20 may include the associated software to process the perception data. Some cameras are directed horizontally, while others are directed upward, and some are directed downward as shown. The system 10 may also include entry detection units that provide a curtain of, e.g., infrared illumination by a source 22 across the opening as well as a detector 24 for detecting a break in the illumination. The detection units therefor provide a signal that an object has entered the drop scanner 10.

The perception system may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with a stock keeping unit (SKU), which identifies the item.

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor.

The manner in which outbound objects are organized is such that objects are placed in a bin, shelf location or cubby, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from the SKU of the object.

It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object with a SKU.

The operations of the systems described above are coordinated by the central control system 20. This system determines from symbol strings the SKU associated with an object, as well as the outbound destination for the object. The central control system is comprised of one or more workstations or central processing units (CPUs). The correspondence between SKUs and outbound destinations is maintained by the central control system in a database called a manifest. The central control system maintains the manifest by communicating with a warehouse management system (WMS).

During operation, the broad flow of work may be generally as follows. First, the system is equipped with a manifest that provides the outbound destination for each inbound object. Next, the system waits for inbound objects to arrive either in a bin or on a conveyor. The robotic system may pick one item at a time from the input bin, and may drop each item into the perception system discussed above. If the perception system successfully recognizes a marking on the object, then the object is then identified and forwarded to a sorting station or other processing station. If the object is not identified, the robotic system may either replace the object back onto the input conveyor and try again, or the conveyor may divert the object to a human sortation bin to be reviewed by a human.

The sequence of locations and orientations of the perception units are chosen so as to minimize the average or maximum amount of time that scanning takes. Again, if the object cannot be identified, the object may be transferred to a special outbound destination for unidentified objects, or it may be returned to the inbound stream. This entire procedure operates in a loop until all of the objects in the inbound set are depleted. The objects in the inbound stream are automatically identified, sorted, and routed to outbound destinations.

In accordance with an embodiment therefore, the invention provides a system for sorting objects that arrive inbound bins and that need to be placed into a shelf of outbound bins, where sorting is to be based on a unique identifier symbol. Key specializations in this embodiment are the specific design of the perception system so as to maximize the probability of a successful scan, while simultaneously minimizing the average scan time. The probability of a successful scan and the average scan time make up key performance characteristics. These key performance characteristics are determined by the configuration and properties of the perception system, as well as the object set and how they are marked.

The two key performance characteristics may be optimized for a given item set and method of barcode labeling. Parameters of the optimization for a barcode system include how many barcode scanners, where and in what orientation to place them, and what sensor resolutions and fields of view for the scanners to use. Optimization can be done through trial and error, or by simulation with models of the object.

Optimization through simulation employs a barcode scanner performance model. A barcode scanner performance model is the range of positions, orientations and barcode element size that a barcode symbol can be detected and decoded by the barcode scanner, where the barcode element size is the size of the smallest feature on the barcode. These are typically rated at a minimum and maximum range, a maximum skew angle, a maximum pitch angle, and a minimum and maximum tilt angle.

Typical performance for camera-based barcode scanners are that they are able to detect barcode symbols within some range of distances as long as both pitch and skew of the plane of the symbol are within the range of plus or minus 45 degrees, while the tilt of the symbol can be arbitrary (between 0 and 360 degrees). The barcode scanner performance model predicts whether a given barcode symbol in a given position and orientation will be detected.

The barcode scanner performance model is coupled with a model of where barcodes would expect to be positioned and oriented. A barcode symbol pose model is the range of all positions and orientations, in other words poses, in which a barcode symbol will expect to be found. For the scanner, the barcode symbol pose model is itself a combination of an article gripping model, which predicts how objects will be held by the robotic system, as well as a barcode-item appearance model, which describes the possible placements of the barcode symbol on the object. For the scanner, the barcode symbol pose model is itself a combination of the barcode-item appearance model, as well as an inbound-object pose model, which models the distribution of poses over which inbound articles are presented to the scanner. These models may be constructed empirically, modeled using an analytical model, or approximate models may be employed using simple sphere models for objects and a uniform distributions over the sphere as a barcode-item appearance model.

Figure 3:
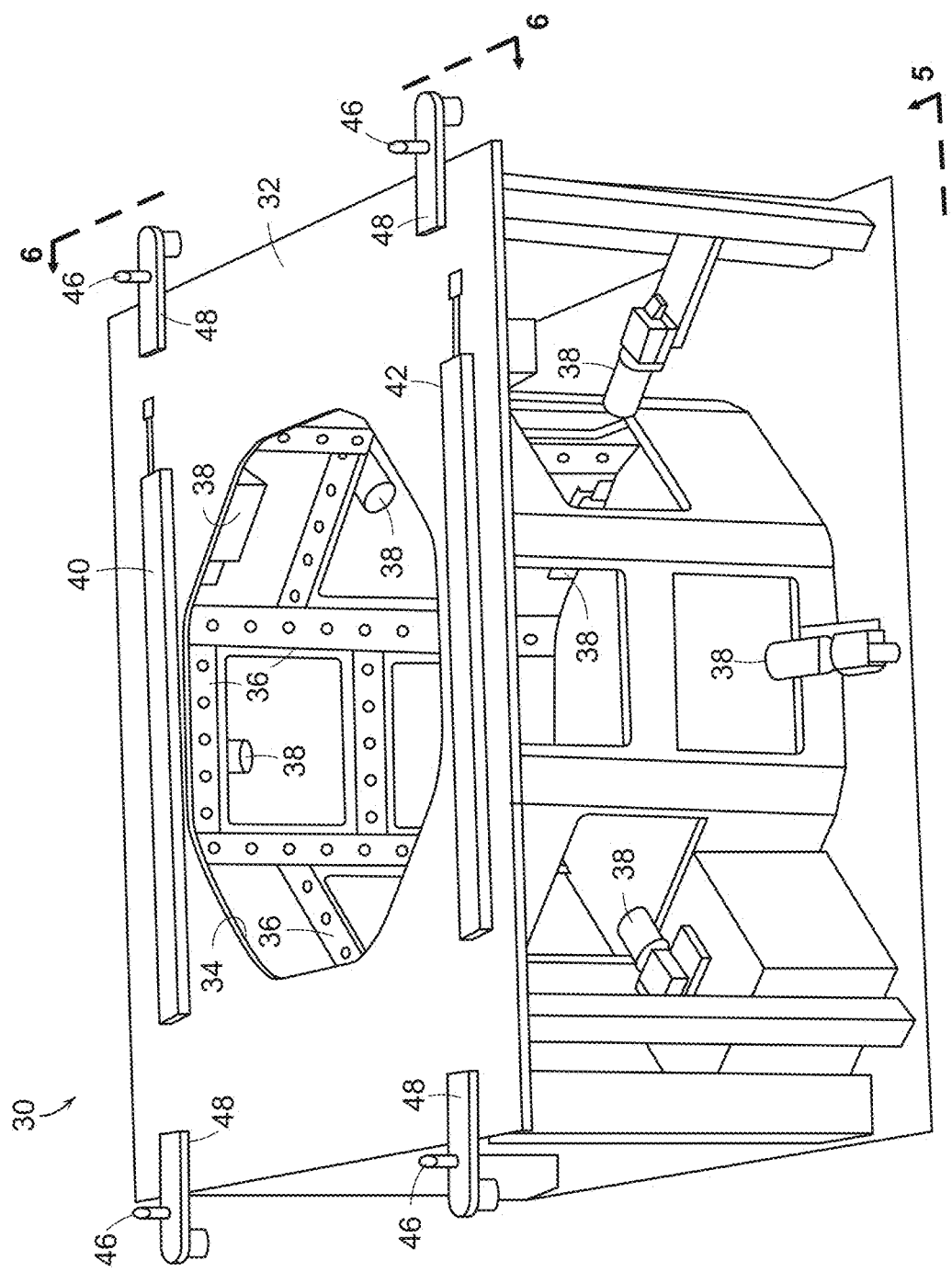
FIG. 3 shows an illustrative isometric diagrammatic view of a perception system in accordance with another embodiment of the present invention.
Figure 4:
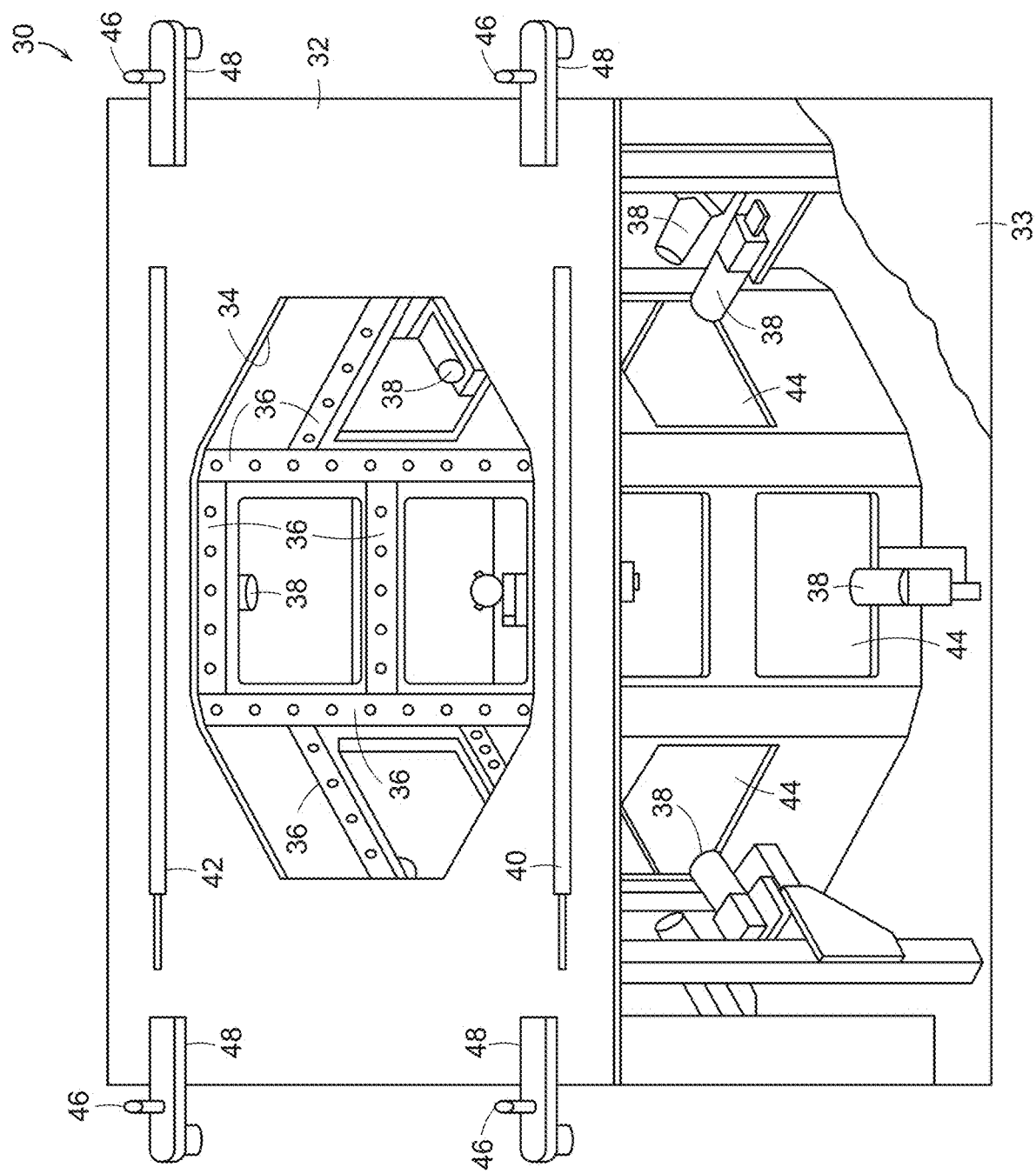
FIG. 4 shows an illustrative elevated rear view of the perception system of FIG. 3.

FIG. 3 shows a perception system 30 in accordance with another embodiment of the present invention that includes a structure 32 having an opening 34. The structure 32 includes a plurality of rows of sources (e.g., illumination sources such as LEDs) 36 as well as a plurality of image perception units (e.g., cameras) 38. The sources 36 are provided in rows, and each is directed toward the center of the opening. The perception units 38 are also generally directed toward the opening, although, as with the embodiment of FIGS. 1 and 2, some cameras are directed horizontally, while others are directed upward, and some are directed downward. The system 30 also includes an entry source (e.g., infrared source) 40 as well as an entry detector (e.g., infrared detector 42) for detecting when an object has entered the detection system 30.

The LEDs and cameras therefore encircle the inside of the structure 32, and the cameras are positioned to view the interior via windows that may include a glass or plastic covering (e.g., 44). The structure 32 may be suspended by loop hooks 46 or placed over an opening and hang by brackets 48.

Figure 5:
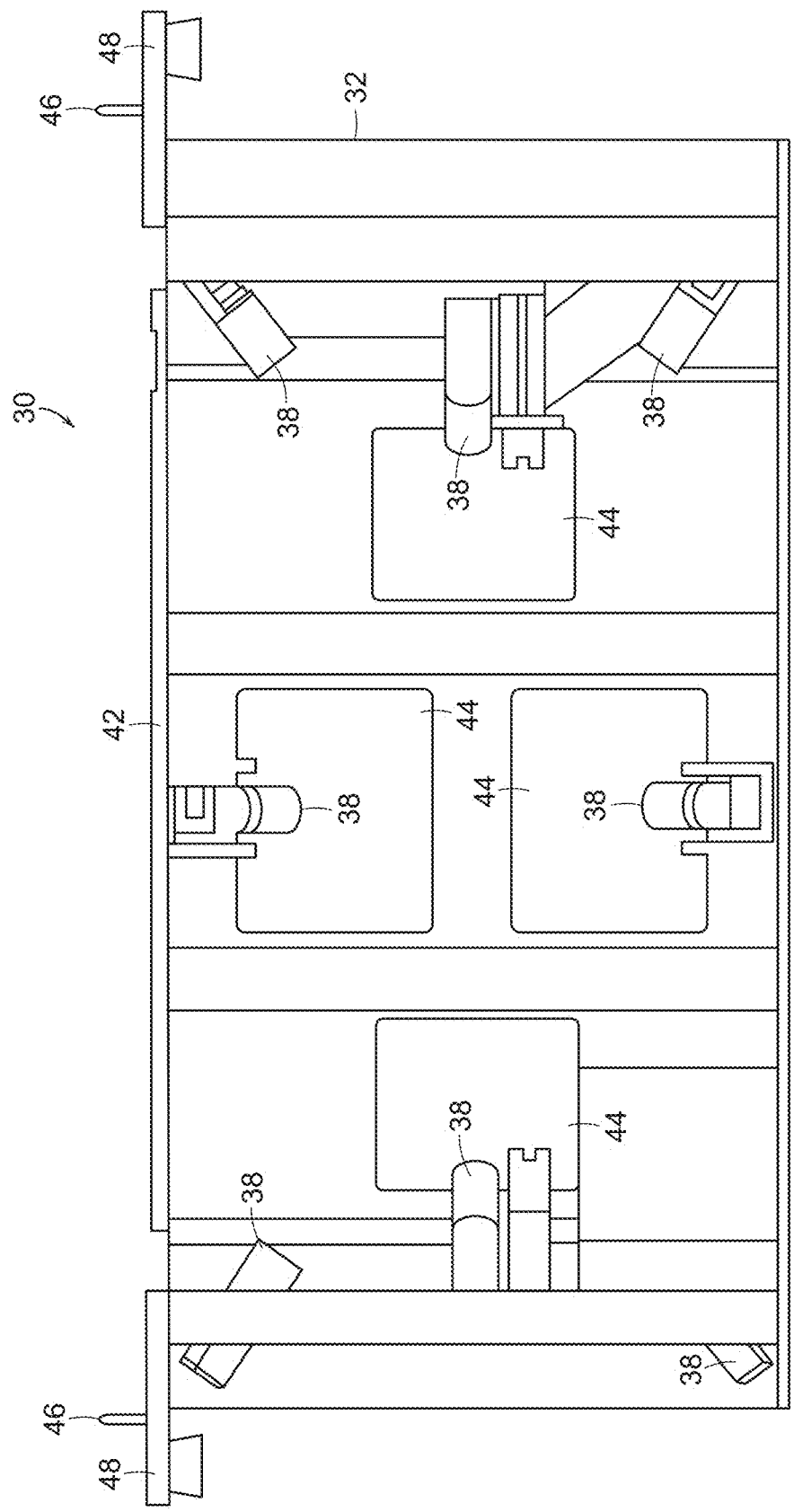
FIG. 5 shows an illustrative front view of the perception system of FIG. 3 taken along line 5-5 thereof.
Figure 6:
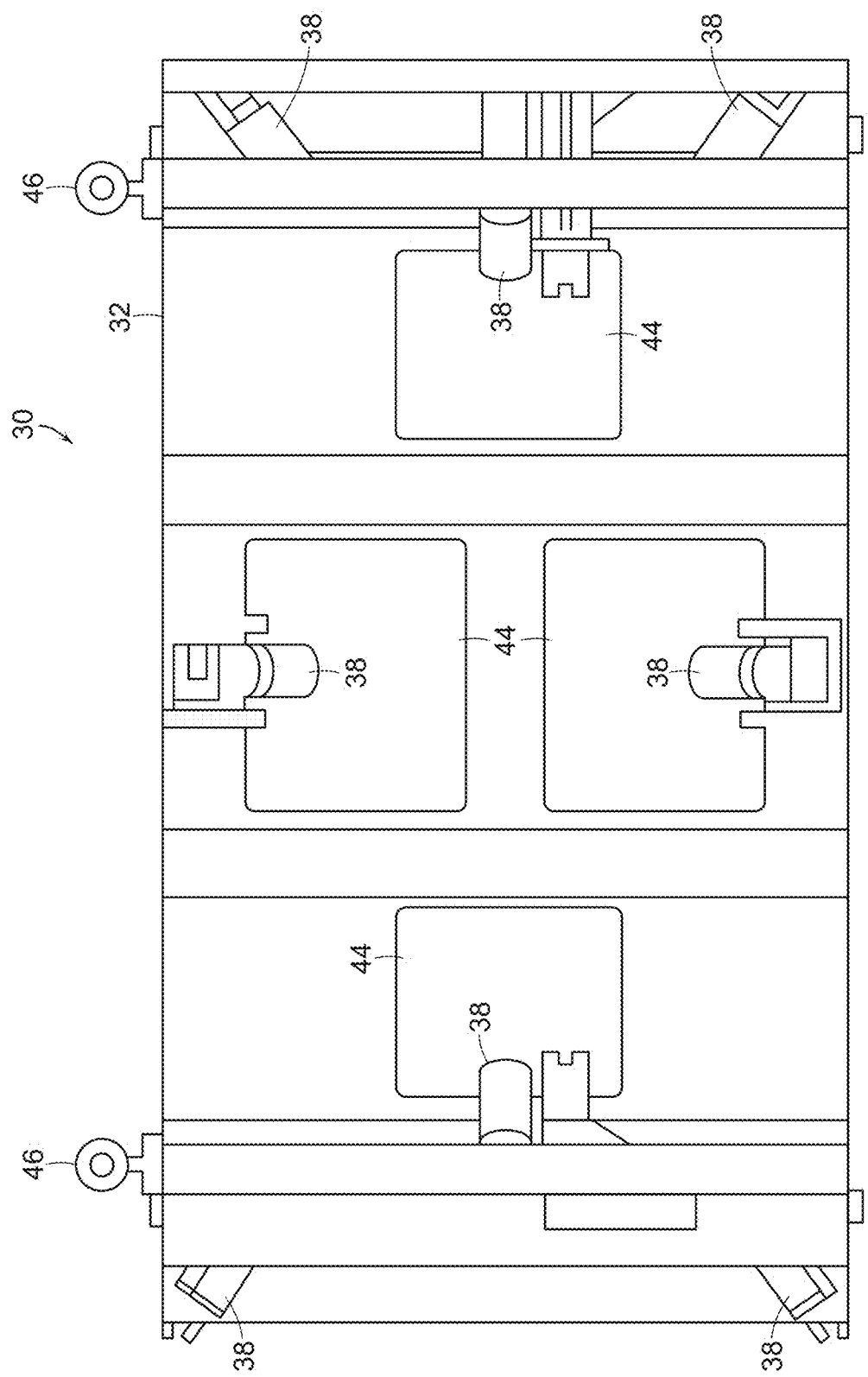
FIG. 6 shows an illustrative side view of the perception system of FIG. 3 taken along line 6-6 thereof.
Figure 7:
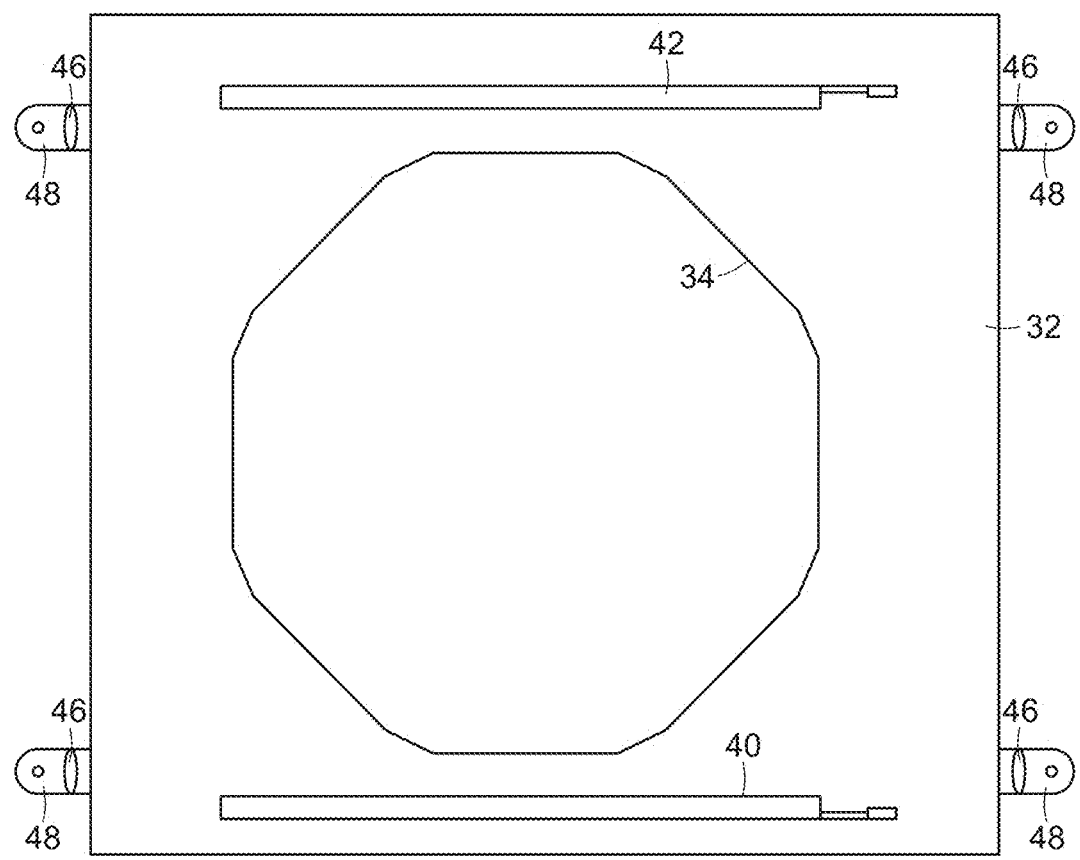
FIG. 7 shows an illustrative top view of the perception system of FIG. 3.
Figure 8:
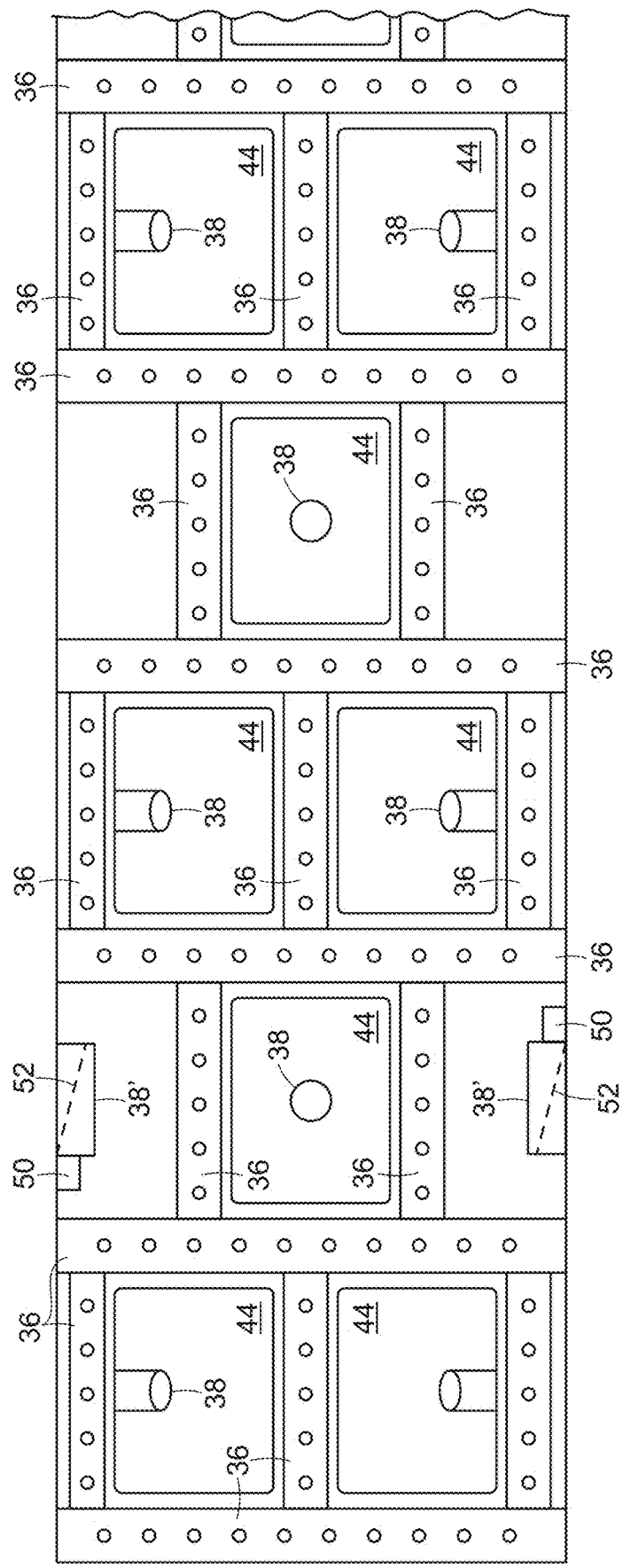
FIG. 8 shows an illustrative linear diagrammatic view of a portion of the inside of the perception system of FIG. 3.
Figure 9A:
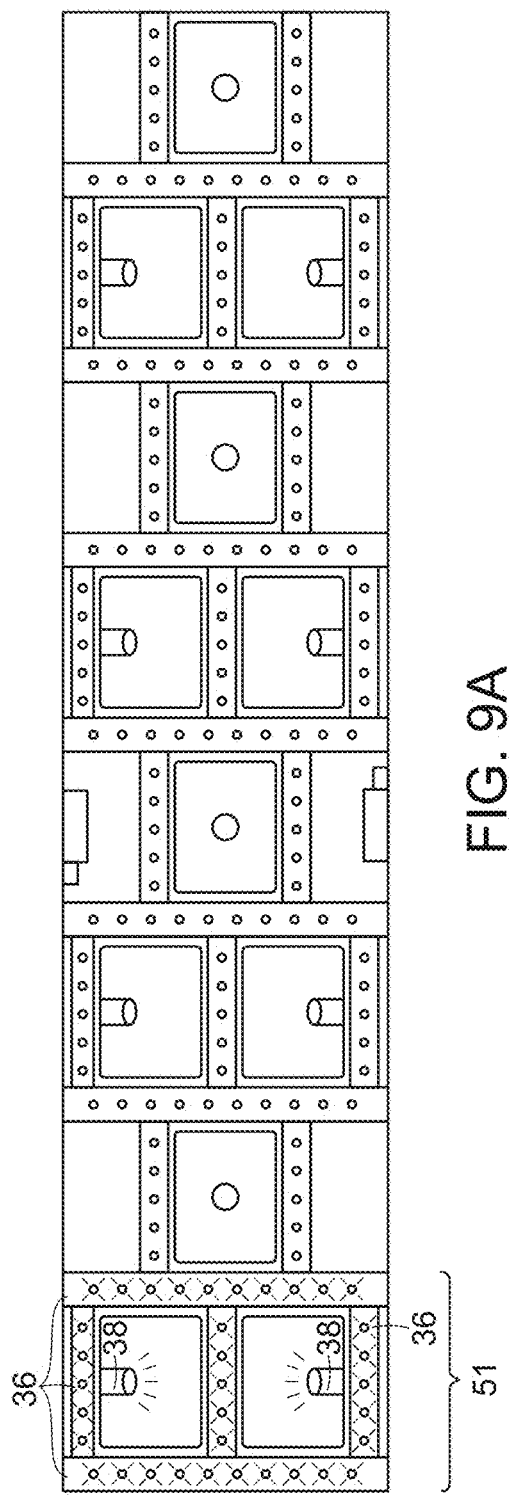
Figure 9B:
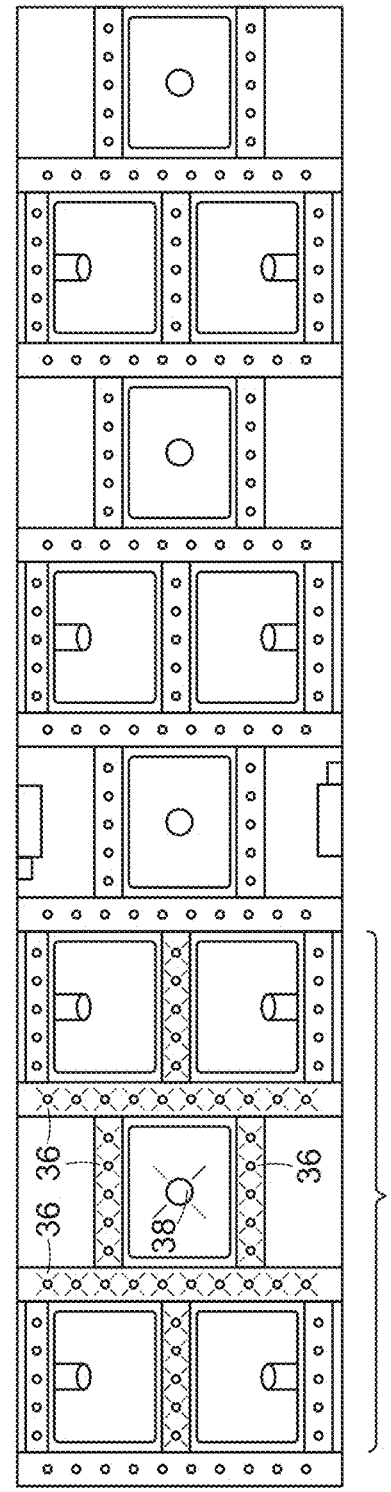
Figure 9C:
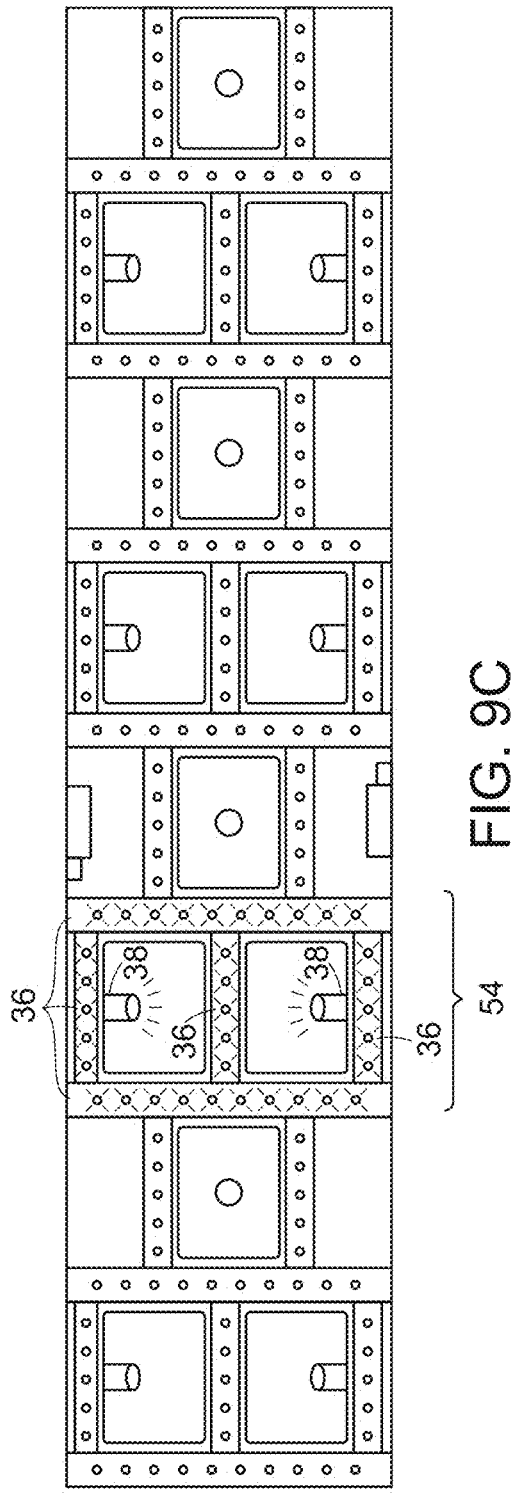
Figure 9D:
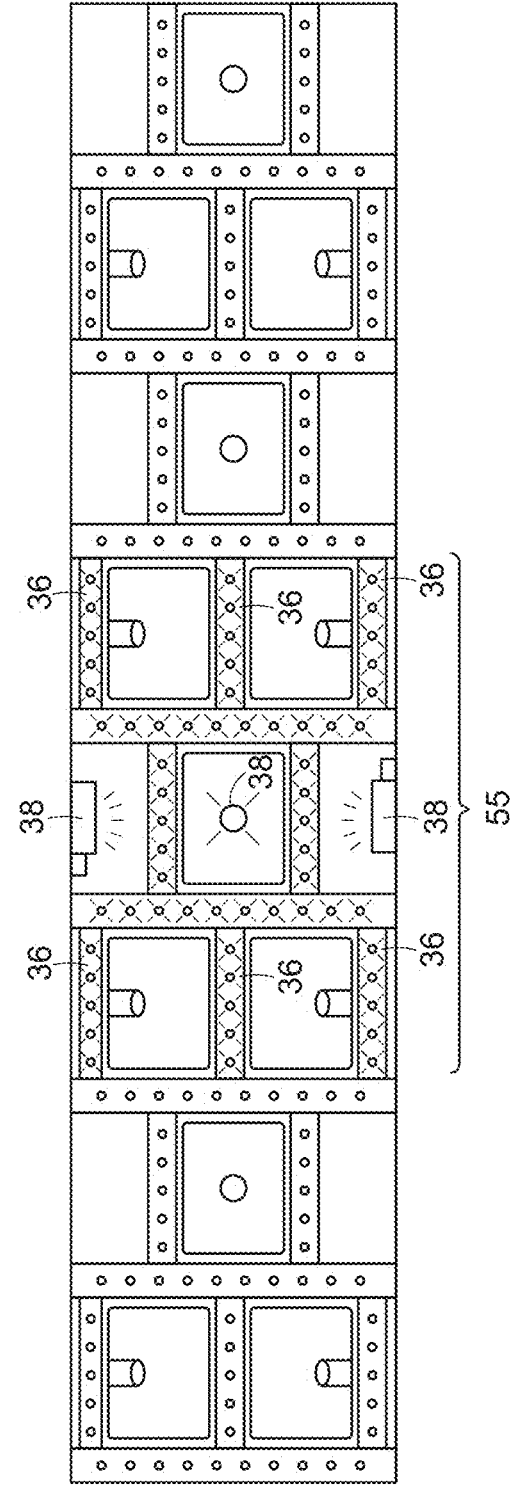
Figure 9G:
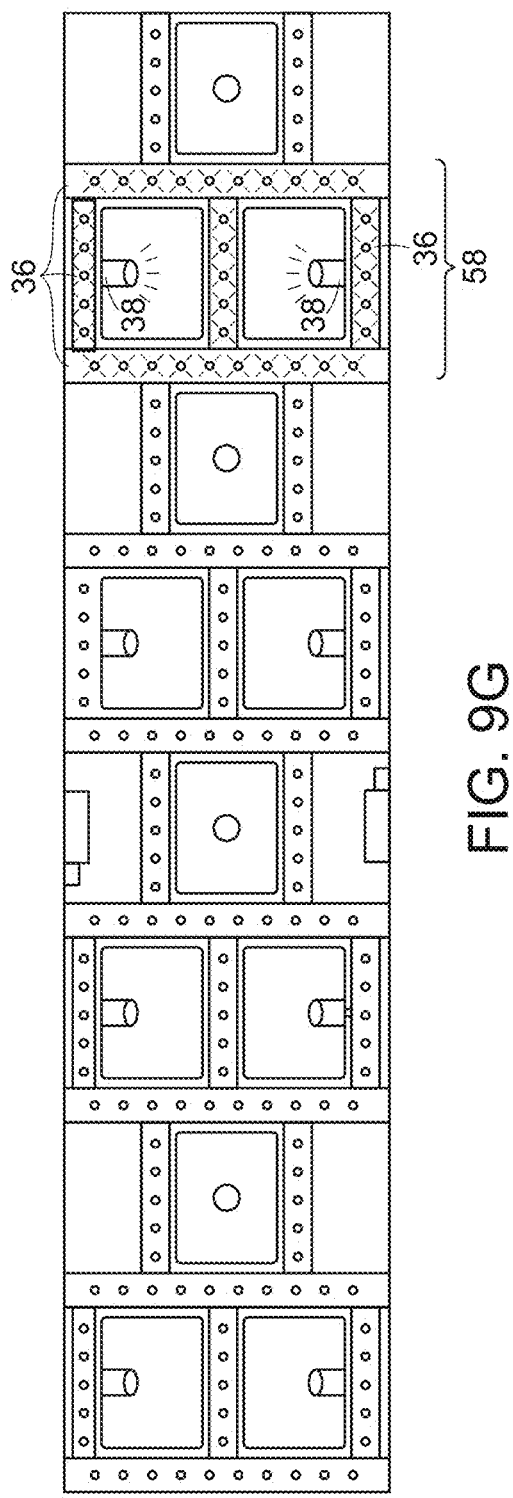
Figure 9H:
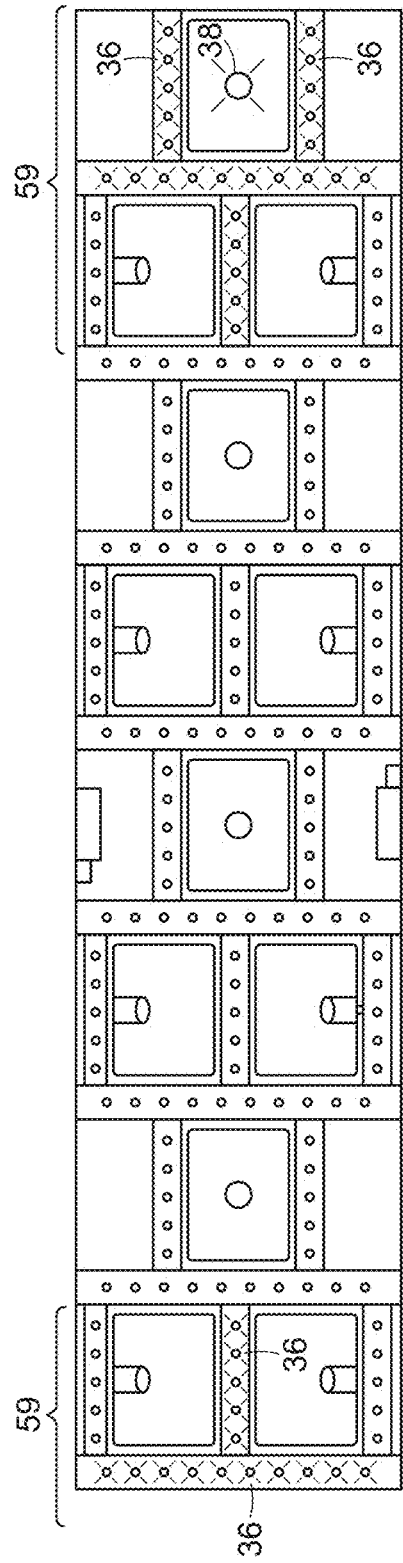

FIG. 8 shows a portion of the interior of the scanner 30, where the sections are show laid out linearly. The cameras 38' each include a camera portion 50 as well as an angled mirror 52 that provides the desired field of view within the structure 32. Similarly, FIGS. 9A-9H diagrammatically and linearly, show the interior of the structure 32 within the scanning region. As soon as the entry detector 40, 42 senses that an item has entered the scanning region, the LEDs and cameras follow a sequence of steps that capture many images. In particular, as shown at 51 in FIG. 9A, a first set of LEDs 36 are illuminated, and a first set of cameras 38 are engaged to take a number of pictures (a first set of images) of the interior of the scanner. As shown at 53 in FIG. 9B, a second set of LEDs 36 are illuminated, and a second set of cameras 38 (in this case one camera) are engaged to take a number of pictures (a second set of images) of the interior of the scanner. As shown at 54 in FIG. 9C, a third set of LEDs 36 are illuminated, and a third set of cameras 38 are engaged to take a number of pictures (a third set of images) of the interior of the scanner. As shown at 55 in FIG. 9D, a fourth set of LEDs 36 are illuminated, and a fourth set of cameras 38 are engaged to take a number of pictures (a fourth set of images) of the interior of the scanner. As shown at 56 in FIG. 9E, a fifth set of LEDs 36 are illuminated, and a fifth set of cameras 38 are engaged to take a number of pictures (a fifth set of images) of the interior of the scanner. As shown at 57 in FIG. 9F, a sixth set of LEDs 36 are illuminated, and a sixth set of cameras 38 are engaged to take a number of pictures (a sixth set of images) of the interior of the scanner. As shown at 58 in FIG. 9G, a seventh set of LEDs 36 are illuminated, and a seventh set of cameras 38 are engaged to take a number of pictures (a seventh set of images) of the interior of the scanner. As shown at 59 in FIG. 9H, an eighth set of LEDs 36 are illuminated, and an eighth set of cameras 38 are engaged to take a number of pictures (an eighth set of images) of the interior of the scanner. Again, the openings in the structure through which the cameras capture images may include a transparent glass or plastic 44. Each of the rows of LEDs 36 may also include a covering of transparent glass or plastic that is separate from the glass or plastic 44 of the openings to avoid light being transmitted through the glass to any detectors 38. Also, the outside of the structure may be covered (except for the top and bottom openings) with a protective film 33 (e.g., an amber film) as shown in FIG. 5, that filters some of the wavelengths of the LEDs for the protection of any persons in the area.

Figure 10A:
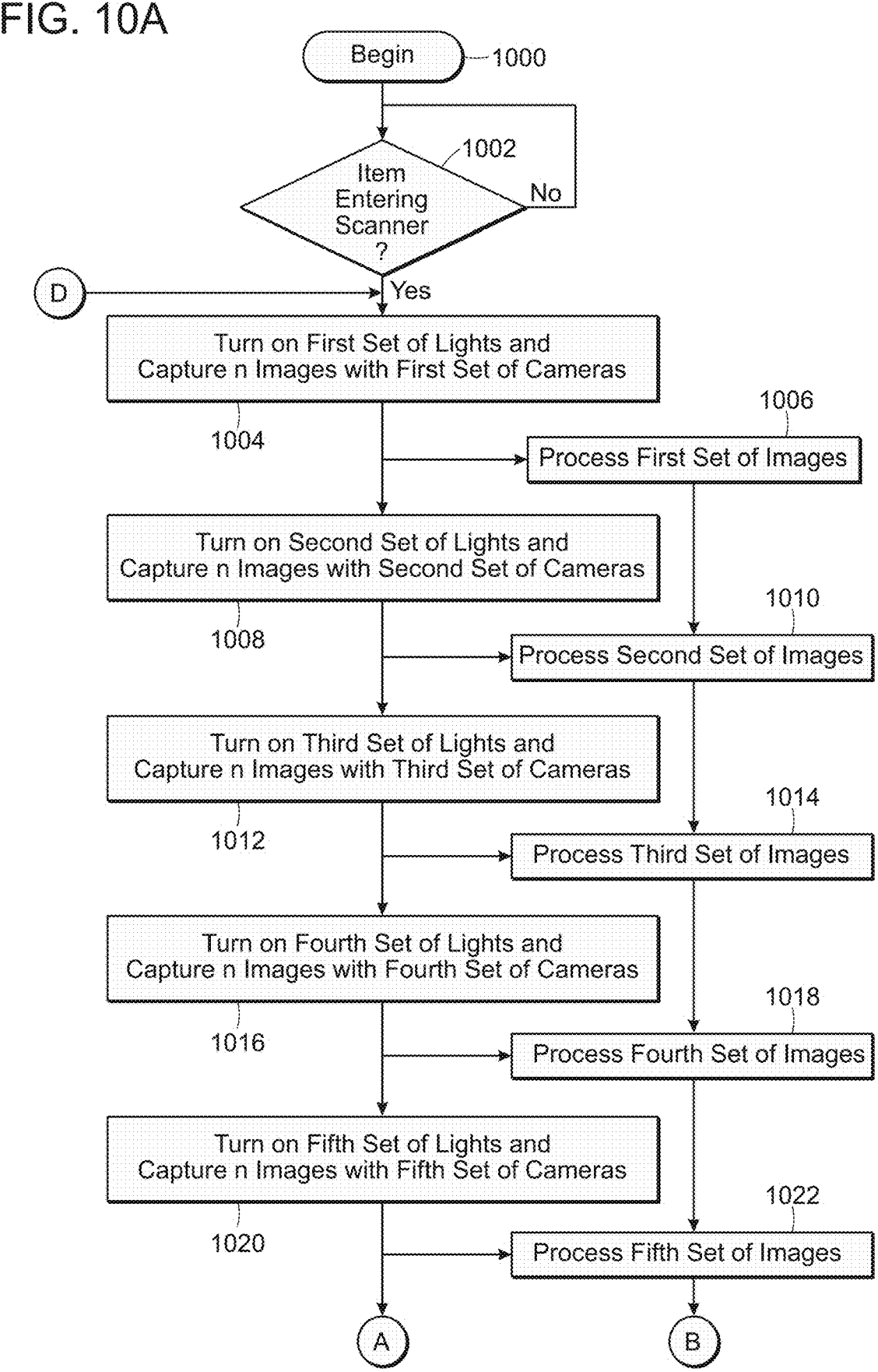
FIGS. 10A-10C show illustrative views of a flowchart showing an operation of the perception system of FIG. 3.
Figure 10B:
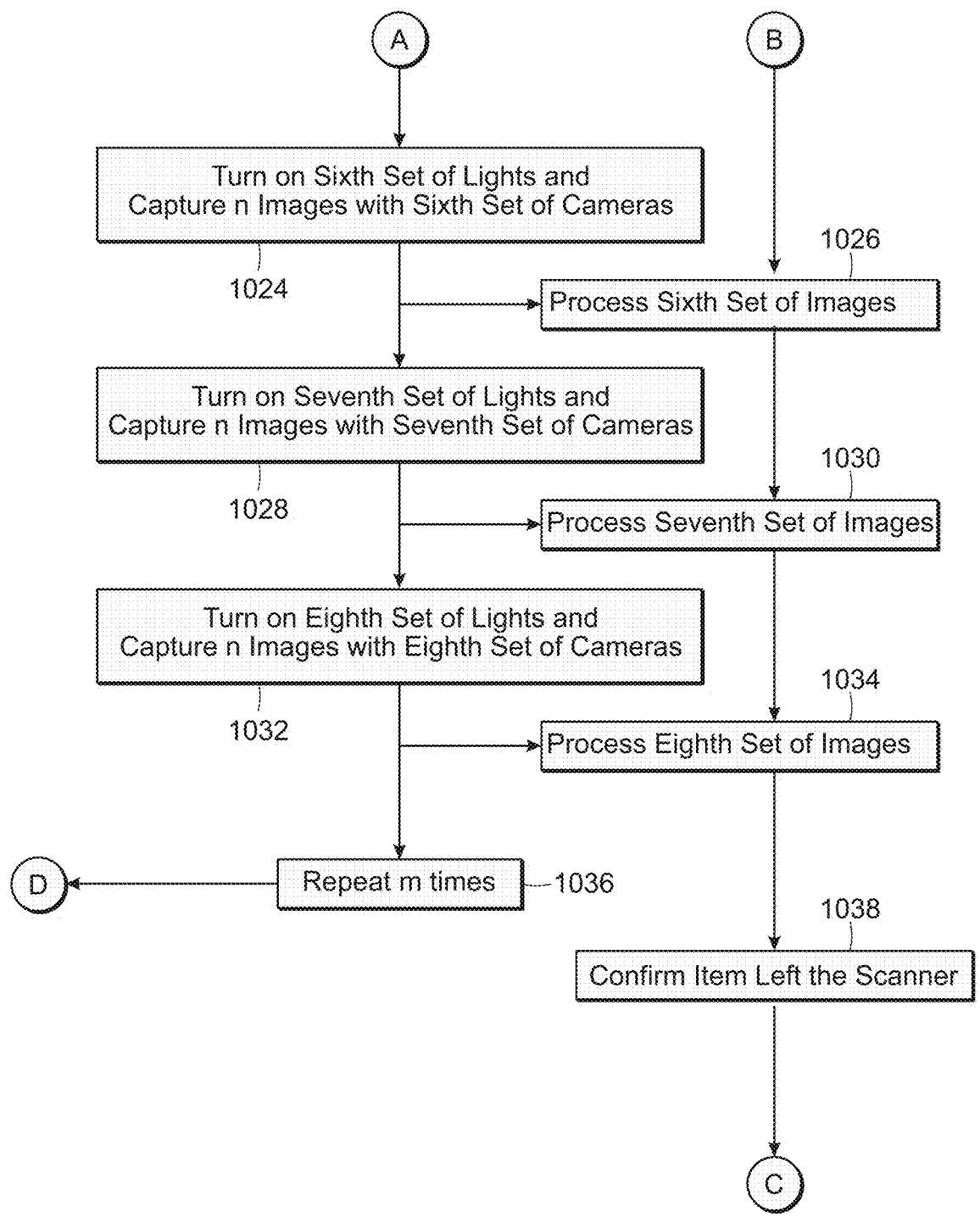
Figure 10C:
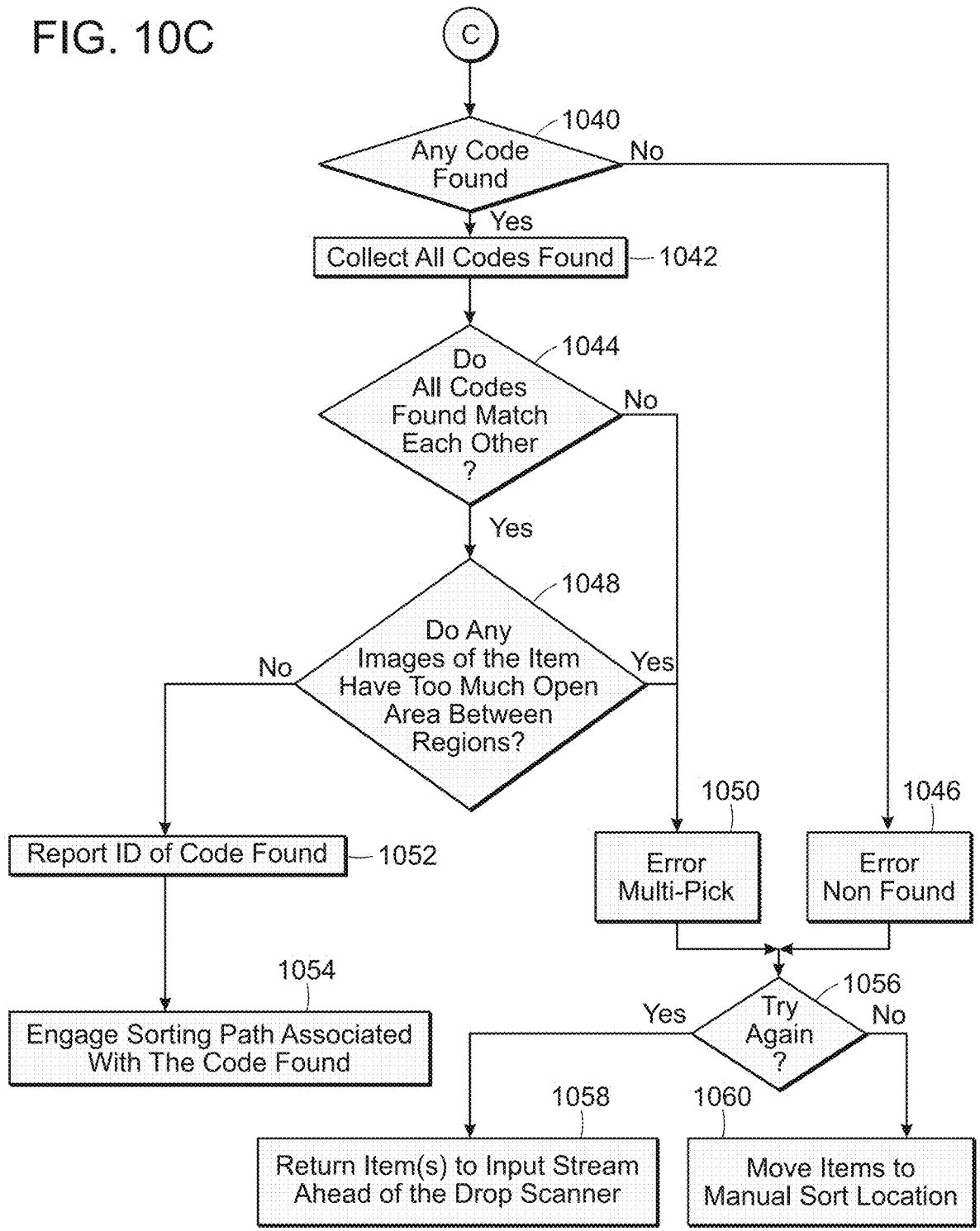

With further reference to FIGS. 10A-10C, the process begins (step 1000) with the entry detectors 40, 42 detecting whether an object has entered the scanner (step 1002). Once this happens, the first set of lights are turned on and the first set of cameras begin capturing images (step 1004). The first sets of lights and cameras are then turned off. A first set of captured images are then sent to a processing core for processing (step 1006). The second set of lights are turned on and the second set of cameras begin capturing images (step 1008). The second sets of lights and cameras are then turned off. A second set of captured images are then sent to another processing core for processing (step 1010). The third set of lights are turned on and the third set of cameras begin capturing images (step 1012). The third sets of lights and cameras are then turned off. A third set of captured images are then sent to another processing core for processing (step 1014). The fourth set of lights are turned on and the fourth set of cameras begin capturing images (step 1016). The fourth sets of lights and cameras are then turned off. A fourth set of captured images are then sent to another processing core for processing (step 1018). The fifth set of lights are turned on and the fifth set of cameras begin capturing images (step 1020). The fifth sets of lights and cameras are then turned off. A fifth set of captured images are then sent to another processing core for processing (step 1022). The sixth set of lights are turned on and the sixth set of cameras begin capturing images (step 1024). The sixth sets of lights and cameras are then turned off. A sixth set of captured images are then sent to another processing core for processing (step 1026). The seventh set of lights are turned on and the seventh set of cameras begin capturing images (step 1028). The seventh sets of lights and cameras are then turned off. A seventh set of captured images are then sent to another processing core for processing (step 1030). The eighth set of lights are turned on and the eighth set of cameras begin capturing images (step 1032). The eighth sets of lights and cameras are then turned off. A eighth set of captured images are then sent to another processing core for processing (step 1034).

The above process may be repeated any number, m, of times (e.g., 50) (step 1036). After all m repeats have finished, the system confirms that the item has exited the scanner (step 1038). The system then determines whether any codes were found (step 1040), and if not reports and error that no codes were found (step 1046). If a codes was found, the system collects all codes found (step 1042) and determines whether all codes match each other (step 1044). If not, the system reports that more than one item was placed in the scanner (step 1050). If all codes found match each other, the system determines whether more than one item was placed in the scanner (step 1048) by determining whether too much space exists between regions of an item. If so, the system reports that more than one item was placed in the scanner (step 1050). If not, the system reports the identification of the code that was found (step 1052) and engages a sorting path associated with the code that was found (step 1054). If no code was found (step 1046) or if the system detects that more than item was in the scanner (step 1050), the system may ask whether the operator wishes to try the scan again (or may be programmed to do so) (step 1056). If yes, then the system returns the item(s) to the input stream ahead of the drop scanner (step 1058). If not, the system moves the item(s) to a manual sort location for sorting by a person (step 1060).

Figure 11:
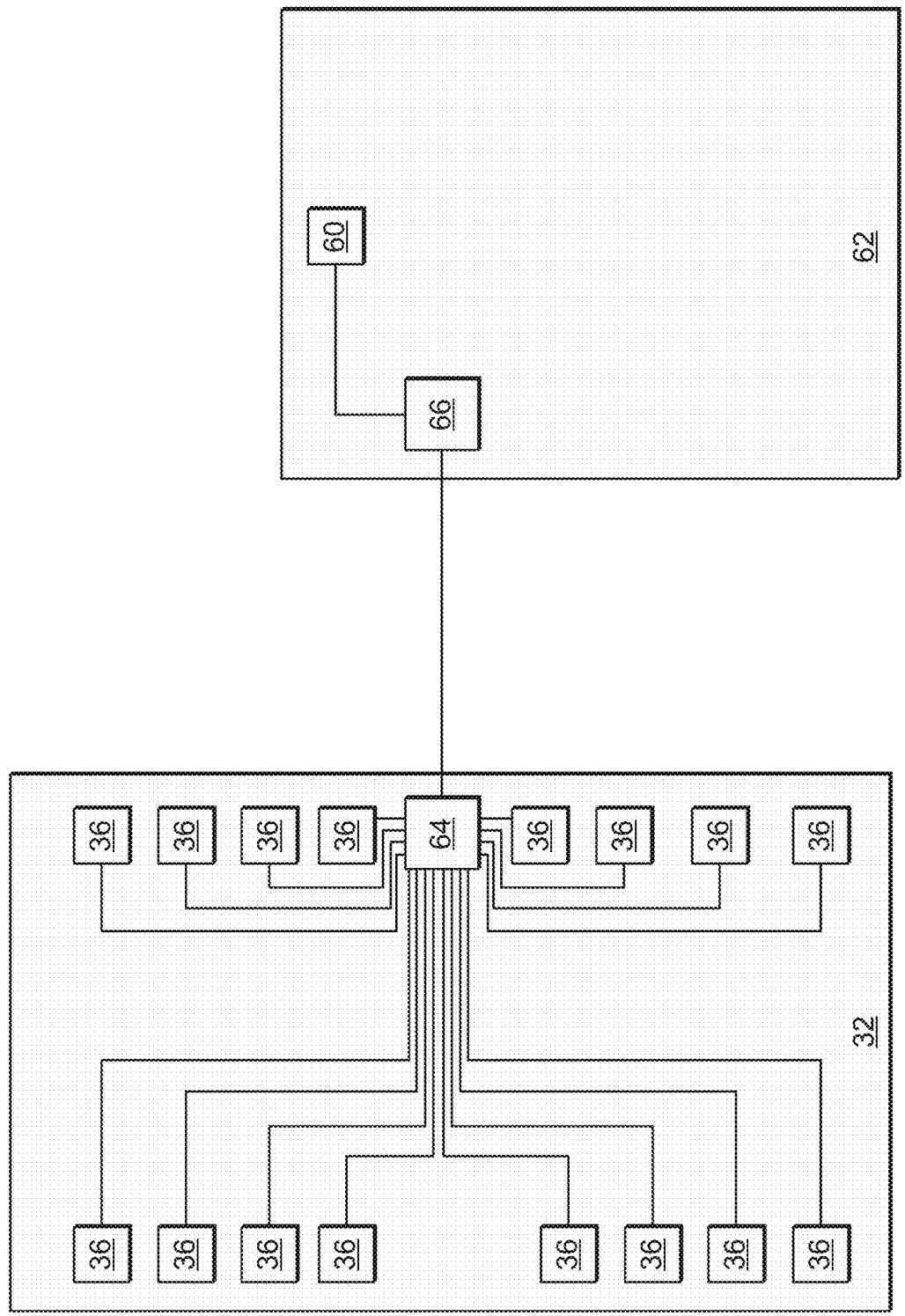
FIG. 11 shows an illustrative diagrammatic view of a lighting system used in the perception system of FIG. 3.
Figure 12:
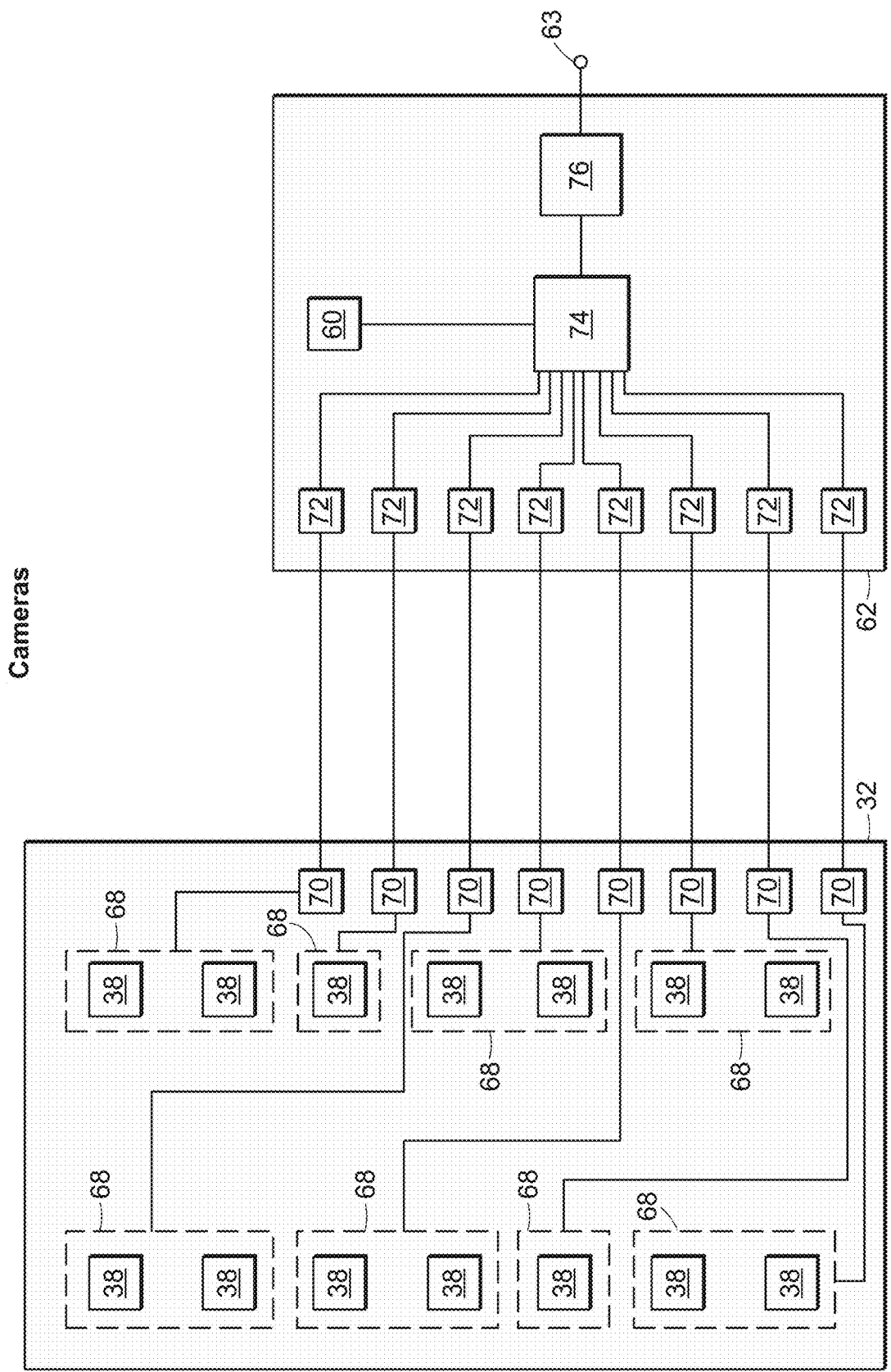
FIG. 12 shows an illustrative diagrammatic view of an image capture system used in the perception system of FIG. 3.

FIG. 11 shows an illustrative diagrammatic view of the control system for the lights in the system of FIG. 3. In particular, a processor 62 is coupled to the structure 32 such that a light controller 66 is directed by a timing unit 60 to provide lighting control signals to a distribution control unit 64 in the structure 32, where the distribution control unit 64 provides individual control to each of the plurality of sets of LEDs 36. As shown in FIG. 11, the processor 62 also includes a camera controller 74 that is coupled to the timing unit 60. The camera controller communicates via core processors 72 to camera controllers 70 on the structure 32, and each camera controller communicates with sets 68 of cameras 38. The controllers 70 control both the triggering of the cameras as well as receive captured image data for processing by each of the respective core processors 72. The results of the core processors 72 are provided to an output identification unit 76.

Figure 13A:
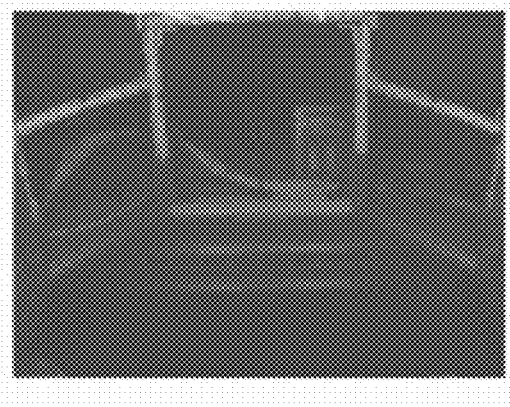
FIGS. 13A-13R show illustrative views of images taken by the perception system of FIG. 3 (FIGS. 13A, 13C, 13E, 13G, 13I, 13K, 13M, 13O, 13Q) as well as associated processed image data (FIGS. 13B, 13D, 13F, 13H, 13J, 13L, 13N, 13P, 13R)
Figure 13B:
Figure 13C:
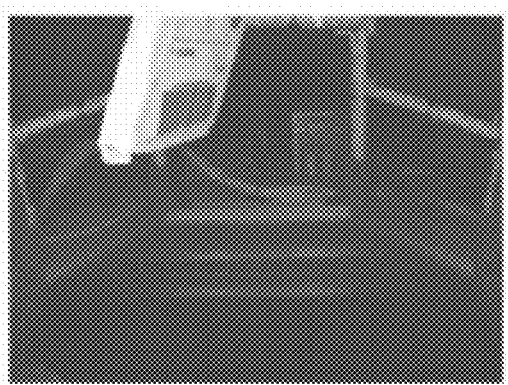
Figure 13D:
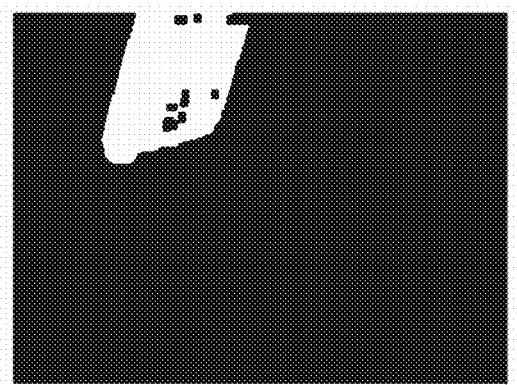
Figure 13E:
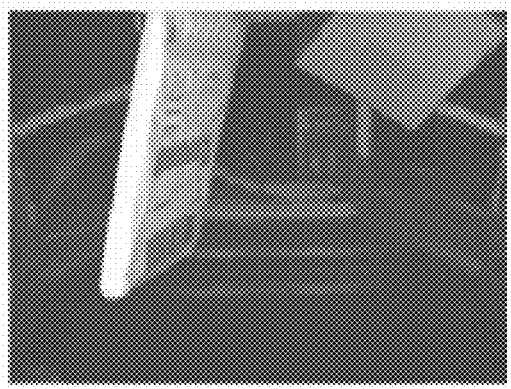
Figure 13F:
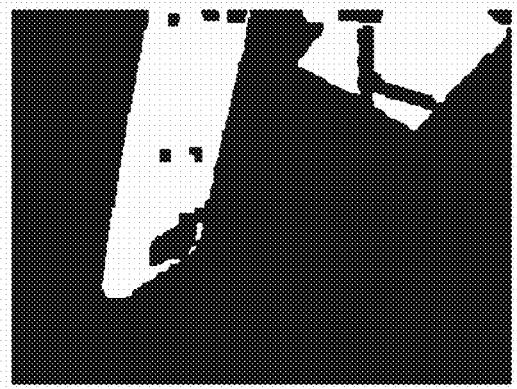
Figure 13G:
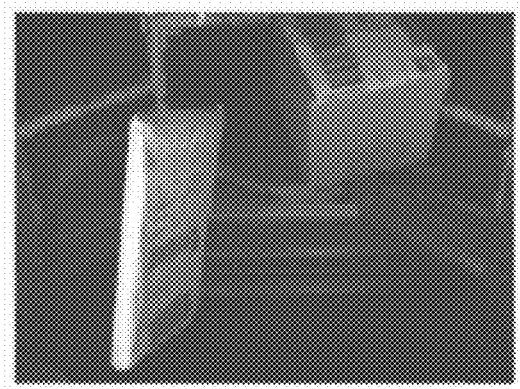
Figure 13H:
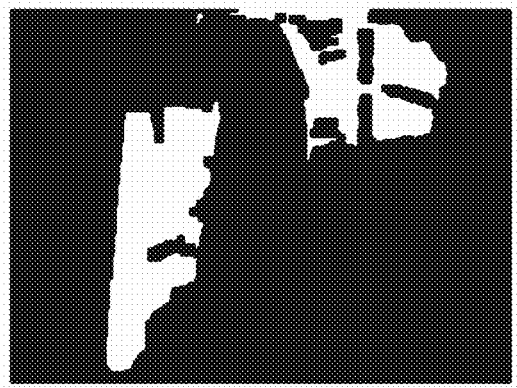
Figure 13I:
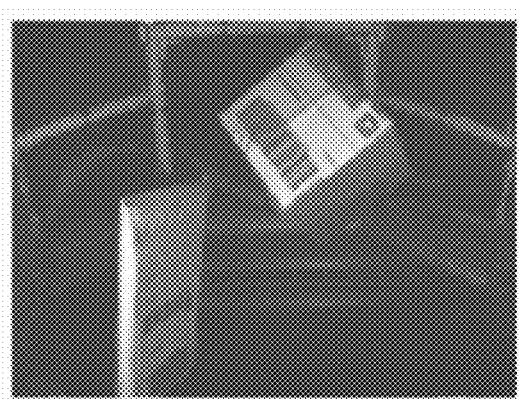
Figure 13J:
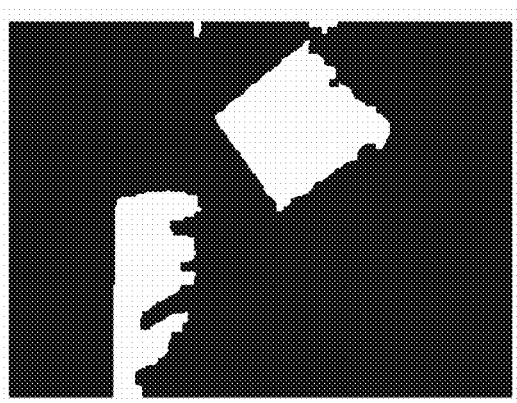
Figure 13K:
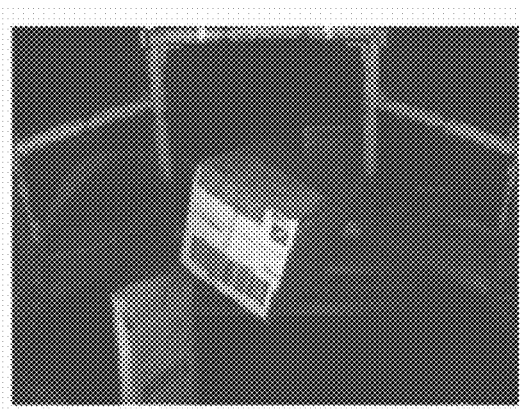
Figure 13L:
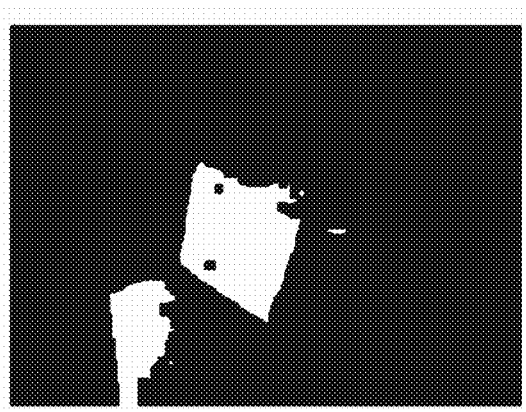
Figure 13M:
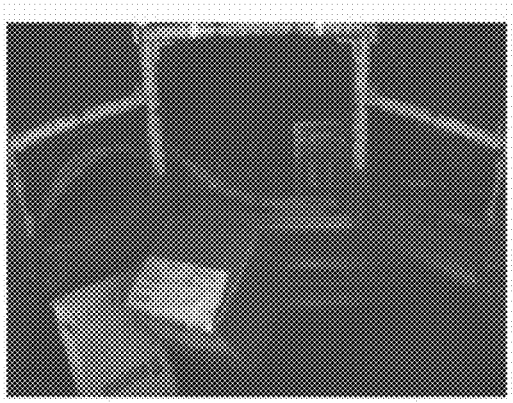
Figure 13N:
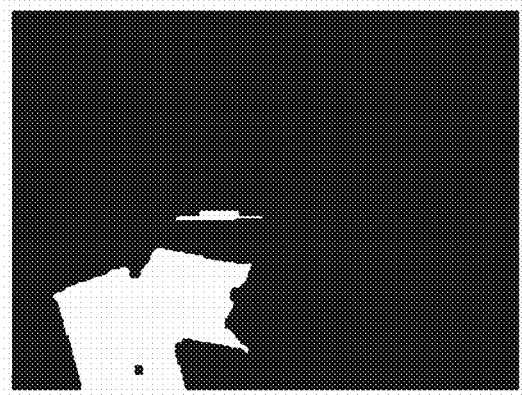
Figure 13O:
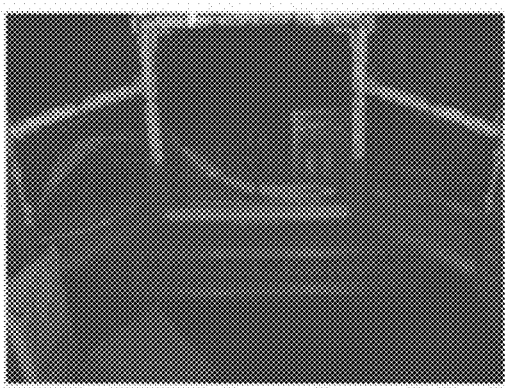
Figure 13P:
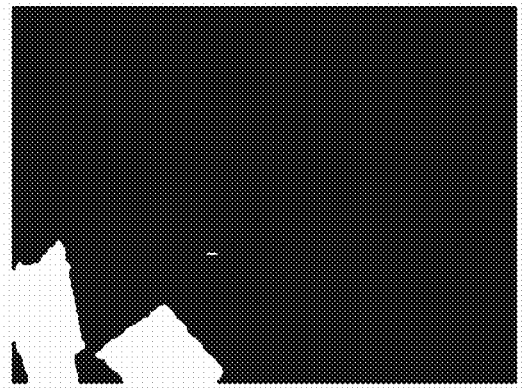
Figure 13Q:
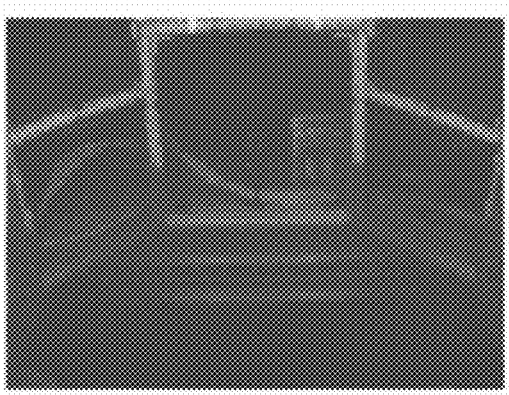
Figure 13R:
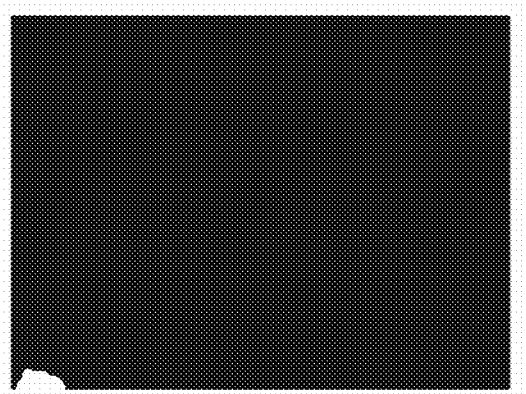

FIGS. 13A-13R show captured images as well as associated processed image data for nine images during the movement of two items through the drop scanner of FIG. 3. In particular, no items are seen in FIG. 13A, and the associated processing image data shown in FIG. 13B shows no signal. In FIG. 13C, an item appears in the image, and the associated processed image data in FIG. 13D shows the image of the item. As shown in FIG. 13E, a second item appears in the field of view, and the associated processing image data shown in FIG. 13F shows the second item. In this image (as well as in the processed image data of FIGS. 13H and 13J), the system would detect that more than one item has been dropped in the scanner because too much area would appear between the two items. As shown in FIG. 13G, the second item continues to appear in the field of view, and the associated processing image data is shown in FIG. 13H. Similarly, as shown in FIG. 13I, the second item continues to appear in the field of view but begins to move closer to the first item, and the associated processing image data is shown in FIG. 13J. As shown in FIG. 13K, the second item has moved even closer to the first item, and the associated processing image data is shown in FIG. 13L. As shown in FIGS. 13M and 13O, the second item has moved very close to the first item, and the associated processing image data is shown respectively in FIGS. 13N and 13P. FIG. 13Q shows that the items are leaving or have left the scanner, and the associated processing image data is shown in FIG. 13R. The capture of multiple images is therefore important to identifying whether more than one item is presented at one time in the scanner 32.

Figure 14:
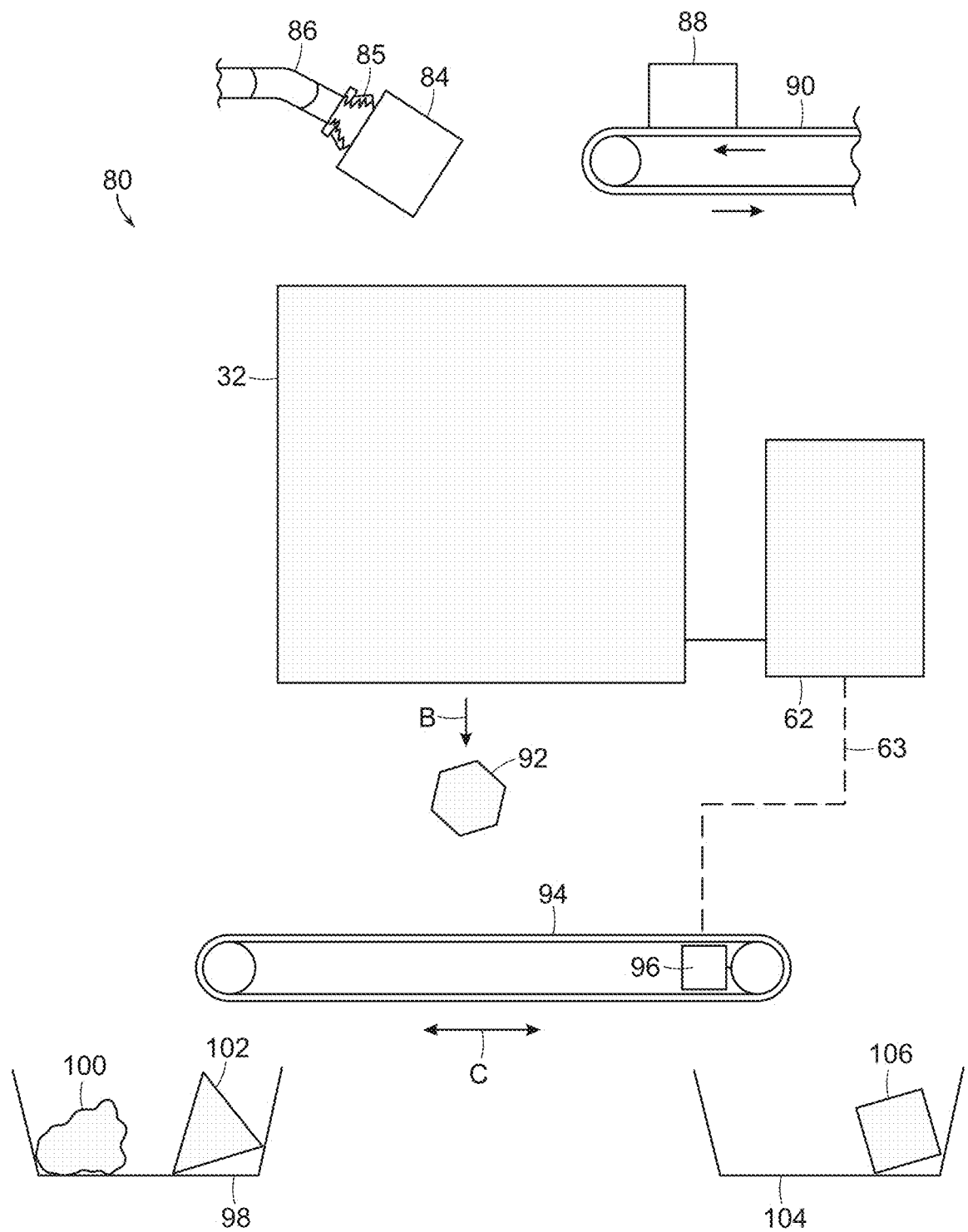
FIG. 14 shows a sortation system including the perception system of FIG. 3 together with infeed devices and a sortation device.

As discussed above, the output of the processor provides a signal indicative of the identified code of the item in the scanner, and based on this, a sortation system may immediately take action consistent with having the item routed in the desired direction or processing path. For example, FIG. 14 shows a sortation system employing a scanning unit of FIG. 3. Items may be dropped into the scanner by any means, such as but not including a robotic arm 86 (dropping an item 84) or an input conveyor 90 (dropping an item 88). In the case of a robotic arm 86, the end effector may employ deflection sensors 85 for detecting whether the item 84 is moving (e.g., swinging) with respect to the robotic arm 86 (and if so, wait until the movement ceases) prior to dropping the item into the scanner 32.

The scanner 32 is coupled to the processor 62 as discussed above, and an output sortation control signal 63 is provided to a sortation system, such as for example, a controller 96 of a conveyor 94 that provides direction routing of items (e.g., 92) to any of a plurality of bins, containers or locations 98, 104, for example by moving in either direction as indicated at C. Items 100 and 102, for example had been routed to location 98, and item 106 had been routed to location 104.

Figure 15:
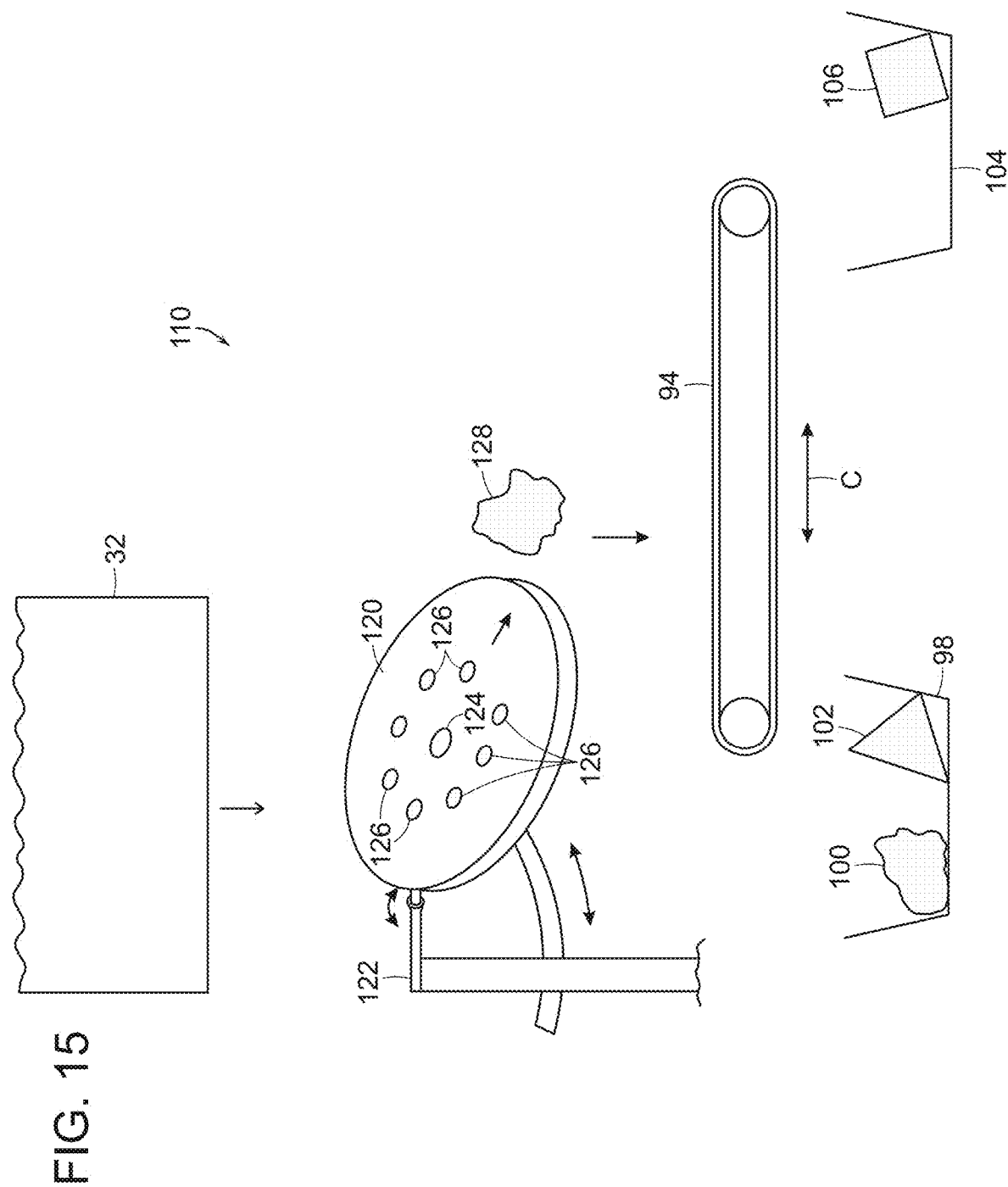
FIG. 15 shows a sortation system including the perception system of FIG. 3 together with an item position/orientation adjustment device including an underside perception unit, as well as a sortation device.

The system may also include an interrupting system that interrupts the falling of an object through the perception system. The interrupting system may be useful, for example, where the item to be scanned is a plastic bag (either opaque or transparent), and particularly, where the identifier code (such as a barcode) is not visible or readily visible by the perception units, for example if the bag is folded and obscures the barcode. With reference to FIG. 15, in this case, the interrupter element may cause the bag to become flattened by an interrupter plate 120. The interrupter plate 120 may include a further detection unit 124 under a transparent window in the interrupter element 120 to detect identifier indicia that is facing the interrupter element, as well as lights 126 that are illuminated when the detection unit 124 is capturing images as discussed above. The interrupter unit 120 may also be provided on a hinged stand 122 that permits the interrupter element to be moved into or out of the path of an item falling from the scanning unit 32. The interrupter unit 120 may be provided inside of or below the scanning unit 32. Again, the scanner 32 is coupled to the processor 62 as discussed above, and an output sortation control signal is provided to a sortation system, such as for example, a controller of a conveyor 94 that provides direction routing of items (e.g., 92) to any of a plurality of bins, containers or locations 98, 104, for example by moving in either direction as indicated at C.

Figure 16:
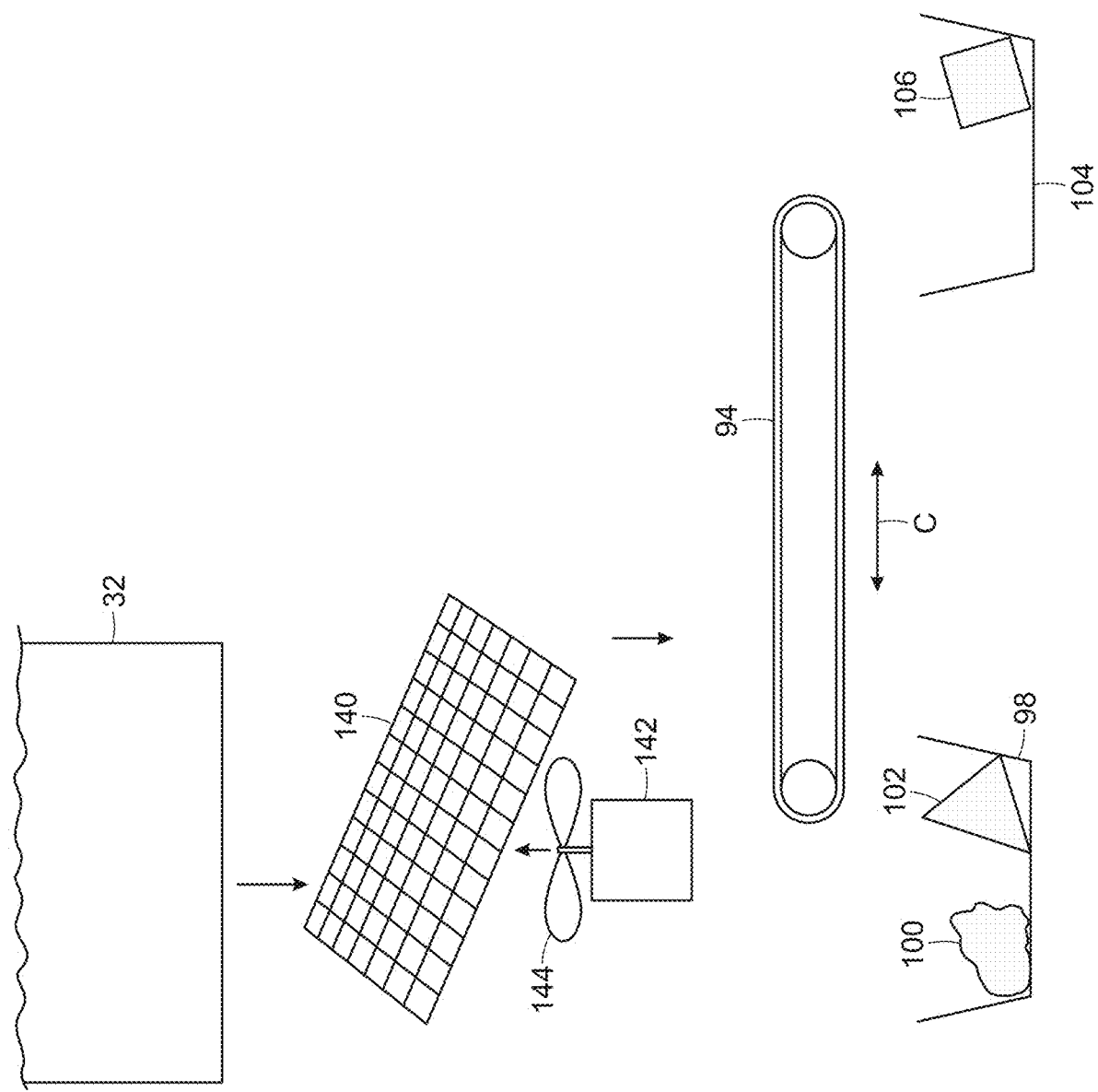
FIG. 16 shows a sortation system including the perception system of FIG. 3 together with an item position/orientation adjustment device including a fan, as well as a sortation device.

In other embodiments, the system may include an interrupting element that urges lighter items upward in a reverse direction for a short time. With reference to FIG. 16, in this case, the interrupter element may cause a light bag to be urged upward by a fan 144 attached to a motor 142 that provides upward air pressure through a screen 140. The fan 144 may be provided inside of or below the scanning unit 32. Again, the scanner 32 is coupled to the processor 62 as discussed above, and an output sortation control signal is provided to a sortation system, such as for example, a controller of a conveyor 94 that provides direction routing of items (e.g., 92) to any of a plurality of bins, containers or locations 98, 104, for example by moving in either direction as indicated at C.

Those skilled in the art will appreciate that numerous modifications and variations may be made to the above disclosed embodiments without departing from the spirit and scope of the present invention.

What is claimed is:

1. A method of processing an object, said method comprising: dropping the object into a perception system through an open top of the perception system, the perception system including a housing having an interior defined between the open top and an open bottom, a first perception unit mounted to the housing proximate the open top and a second perception unit mounted to the housing proximate the open bottom; directing reflected illumination from the object via at least one upper mirror within the housing proximate the open top toward the first perception unit as the object falls through the interior of the housing; capturing first perception data of the object falling through the interior of the housing by the first perception unit; directing reflected illumination from the object via at least one lower mirror within the housing proximate the open bottom toward the second perception unit as the object continues to fall through the interior of the housing; capturing second perception data of the object falling through the interior of the housing by the second perception unit; and identifying unique indicia on the object responsive to any of the first perception data and the second perception data, wherein the first perception unit and the second perception unit are any of a camera and a scanner, and the first perception data and the second perception data are any of images captured by the camera and scanned data captured by the scanner.

2. The method as claimed in claim 1, wherein the scanner is a radio frequency ID scanner.

3. The method as claimed in claim 1, wherein the scanner is a barcode scanner.

4. The method as claimed in claim 1 wherein the scanner is a laser reflectivity scanner.

5. The method as claimed in claim 1, wherein the method further includes detecting the object entering the perception system.

6. The method as claimed in claim 1, wherein the perception system further includes a plurality of illumination sources.

7. The method as claimed in claim 6, wherein the plurality of illumination sources include a plurality of LEDs.

8. The method as claimed in claim 1, wherein the method further includes the step of diverting the object received from the perception system toward one of a plurality of routes responsive to the unique indicia.

9. A drop perception system for processing one or more objects, said drop perception system comprising: a housing having an interior defined between an open top and an open bottom, wherein one or more objects are dropped into the housing through the open top and exit the housing through the open bottom; a first perception unit mounted to the housing proximate the open top and a second perception unit mounted to the housing proximate the open bottom; at least one upper mirror within the housing proximate the open top, said at least one upper mirror for directing reflected illumination from the one or more objects toward the first perception unit as the one or more objects fall through the interior of the housing, said first perception unit for capturing first perception data of the one or more objects falling through the interior of the housing; at least one lower mirror within the housing proximate the open bottom, said at least one lower mirror for directing reflected illumination from the one or more objects toward the second perception unit as the one or more objects continue to fall through the interior of the housing, said second perception unit for capturing second perception data of the one or more objects falling through the interior of the housing; and identifying means for identifying whether more than one unique indicia is captured by any of the first perception data and the second perception data, thereby indicating that more than one object is falling through the interior of the housing, wherein the first perception unit and the second perception unit are any of a camera and a scanner, and the first perception data and the second perception data are any of images captured by the camera and scanned data captured by the scanner.

10. The drop perception system as claimed in claim 9, wherein the scanner is a radio frequency ID scanner.

11. The drop perception system as claimed in claim 9, wherein the scanner is a barcode scanner.

12. The drop perception system as claimed in claim 9 wherein the scanner is a laser reflectivity scanner.

13. The drop perception system as claimed in claim 9, further comprising an entry detector for detecting the one or more objects entering the open top of the housing.

14. The drop perception system as claimed in claim 9, wherein the drop perception system further includes a plurality of illumination sources.

15. The drop perception system as claimed in claim 14, wherein the plurality of illumination sources include a plurality of LEDs.

16. The drop perception system as claimed in claim 9, wherein the drop perception system is mounted above a conveyor that diverts the object dropped through the drop perception system toward one of a plurality of routes responsive to the unique indicia.

17. A system for processing one or more objects, comprising: a drop perception system that includes: a housing having an interior defined between an open top and an open bottom, wherein one or more objects are dropped into the housing through the open top and exit the housing through the open bottom; a first perception unit mounted to the housing proximate the open top and a second perception unit mounted to the housing proximate the open bottom; at least one upper mirror within the housing proximate the open top, said at least one upper mirror for directing reflected illumination from the one or more objects toward the first perception unit as the one or more objects fall through the interior of the housing, said first perception unit for capturing first perception data of the one or more objects falling through the interior of the housing; at least one lower mirror within the housing proximate the open bottom, said at least one lower mirror for directing reflected illumination from the one or more objects toward the second perception unit as the one or more objects continue to fall through the interior of the housing, said second perception unit for capturing second perception data of the one or more objects falling through the interior of the housing; and identifying means for identifying whether more than one unique indicia is captured by any of the first perception data and the second perception data; and diverting means for routing any objects from the drop perception system responsive to whether more than one unique indicia is captured, wherein the first perception unit and the second perception unit are any of a camera and a scanner, and the first perception data and the second perception data are any of images captured by the camera and scanned data captured by the scanner.

18. The system as claimed in claim 17, wherein the scanner is a radio frequency ID scanner.

19. The system as claimed in claim 17, wherein the scanner is a barcode scanner.

20. The system as claimed in claim 17 wherein the scanner is a laser reflectivity scanner.

21. The system as claimed in claim 17, wherein the drop perception system further includes an entry detector for detecting one or more objects entering the open top of the housing.

22. The system as claimed in claim 17, wherein the drop perception system further includes a plurality of illumination sources.

23. The system as claimed in claim 22, wherein the plurality of illumination sources include a plurality of LEDs.

24. The system as claimed in claim 17, wherein the diverting means includes a direction routing conveyor.

25. A drop perception system, comprising: a housing having an interior defined between an open top and an open bottom, wherein one or more objects are dropped into the housing through the open top and exit the housing through the open bottom; a first perception unit mounted to the housing proximate the open top; at least one upper mirror within the housing proximate the open top, said at least one upper mirror for directing reflected illumination from the one or more objects toward the first perception unit as the one or more objects fall through the interior of the housing, said first perception unit for capturing first perception data of the one or more objects falling through the interior of the housing; a second perception unit mounted to the housing proximate the open bottom for detecting reflected illumination from the one or more objects as the one or more objects falling through the interior of the housing, said second perception unit for capturing second perception data of the one or more objects falling through the interior of the housing; and identifying means for identifying whether more than one unique indicia is captured by any of the first perception data and the second perception data prior to the one or more objects exiting the housing through the open bottom, wherein the first perception unit and the second perception unit are any of a camera and a scanner, and the first perception data and the second perception data are any of images captured by the camera and scanned data captured by the scanner.

26. The drop perception system as claimed in claim 25, wherein the scanner is a radio frequency ID scanner.

27. The drop perception system as claimed in claim 25, wherein the scanner is a barcode scanner.

28. The drop perception system as claimed in claim 25 wherein the scanner is a laser reflectivity scanner.

29. The drop perception system as claimed in claim 25, wherein the drop perception system further includes an entry detector for detecting the one or more objects entering the open top of the housing.

30. The drop perception system as claimed in claim 25, wherein the drop perception system further includes a plurality of illumination sources.

31. The drop perception system as claimed in claim 30, wherein the plurality of illumination sources include a plurality of LEDs.

32. The perception system as claimed in claim 25, wherein the drop perception system is mounted above a conveyor that diverts the one or more objects dropped from the drop perception system toward one of a plurality of routes responsive to the unique indicia.

33. A drop perception system, comprising: a housing having an interior defined between an open top and an open bottom, wherein one or more objects are dropped into the housing through the open top and exit the housing through the open bottom; a first perception unit mounted to the housing proximate the open top for detecting reflected illumination from the one or more objects as the one or more objects fall through the interior of the housing, said first perception unit for capturing first perception data of the one or more objects falling through the interior of the housing; a second perception unit mounted to the housing proximate the open bottom; at least one lower mirror the housing proximate the open bottom, said at least one lower mirror for directing reflected illumination from the one or more objects toward the second perception unit as the one or more objects fall through the interior of the housing, said second perception unit for capturing second perception data of the one or more objects falling through the interior of the housing; and identifying means for identifying whether more than one unique indicia is captured by any of the first perception data and the second perception data prior to the one or more objects exiting the housing through the open bottom, wherein the first perception unit and the second perception unit are any of a camera and a scanner, and the first perception data and the second perception data are any of images captured by the camera and scanned data captured by the scanner.

34. The drop perception system as claimed in claim 33, wherein the scanner is a radio frequency ID scanner.

35. The drop perception system as claimed in claim 33, wherein the scanner is a barcode scanner.

36. The drop perception system as claimed in claim 33 wherein the scanner is a laser reflectivity scanner.

37. The drop perception system as claimed in claim 33, wherein the drop perception system further includes an entry detector for detecting the one or more objects entering the open top of the housing.

38. The drop perception system as claimed in claim 33, wherein the drop perception system further includes a plurality of illumination sources.

39. The drop perception system as claimed in claim 38, wherein the plurality of illumination sources include a plurality of LEDs.

40. The drop perception system as claimed in claim 33, wherein the drop perception system is mounted above a conveyor that diverts the one or more objects toward one of a plurality of routes responsive to the unique indicia.

* * * * *

UNITED STATES PATENT AND TRADEMARK OFFICE
CERTIFICATE OF CORRECTION

| | | |
|---|---|---|
| PATENT NO. | : 11,351,575 B2 | |
| APPLICATION NO. | : 16/900158 | |
| DATED | : June 7, 2022 | |
| INVENTOR(S) | : Thomas Wagner et al. | |

It is certified that error appears in the above-identified patent and that said Letters Patent is hereby corrected as shown below:

In the Claims

In Column 11, Line 35, Claim 8 should read:
"further includes diverting the object received"

Signed and Sealed this
Sixteenth Day of August, 2022

Katherine Kelly Vidal
*Director of the United States Patent and Trademark Office*